US009165276B2

(12) United States Patent
Argue et al.

(10) Patent No.: US 9,165,276 B2
(45) Date of Patent: *Oct. 20, 2015

(54) LOCATING AND ORGANIZING DIGITAL RECEIPT DATA FOR USE IN IN-STORE AUDITS

(75) Inventors: Stuart Argue, Palo Alto, CA (US); Anthony Emile Marcar, San Francisco, CA (US)

(73) Assignee: WAL-MART STORES, INC., Bentonville, AR (US)

(*) Notice: Subject to any disclaimer, the term of this patent is extended or adjusted under 35 U.S.C. 154(b) by 294 days.

This patent is subject to a terminal disclaimer.

(21) Appl. No.: 13/601,786

(22) Filed: Aug. 31, 2012

(65) Prior Publication Data
US 2014/0067568 A1 Mar. 6, 2014

(51) Int. Cl.
G06Q 20/00 (2012.01)
G06Q 10/08 (2012.01)
G06Q 20/20 (2012.01)

(52) U.S. Cl.
CPC .............. *G06Q 10/08* (2013.01); *G06Q 20/20* (2013.01); *G06Q 20/202* (2013.01); *G06Q 20/209* (2013.01)

(58) Field of Classification Search
None
See application file for complete search history.

(56) References Cited

U.S. PATENT DOCUMENTS

| 7,797,192 | B2 * | 9/2010 | Mitchell et al. | 705/16 |
| 2007/0094088 | A1 * | 4/2007 | Mastie et al. | 705/24 |
| 2007/0164106 | A1 * | 7/2007 | McDevitt et al. | 235/383 |
| 2009/0055503 | A1 * | 2/2009 | Crivella et al. | 709/207 |
| 2009/0313132 | A1 * | 12/2009 | McKenna et al. | 705/21 |
| 2010/0257066 | A1 * | 10/2010 | Jones et al. | 705/17 |
| 2011/0320293 | A1 * | 12/2011 | Khan | 705/16 |
| 2012/0253915 | A1 * | 10/2012 | Sock | 705/14.34 |

* cited by examiner

*Primary Examiner* — Ryan Zeender
*Assistant Examiner* — Christopher Buchanan
(74) *Attorney, Agent, or Firm* — Howard & Howard Attorneys PLLC

(57) ABSTRACT

The present invention extends to methods, systems, and computer program products for auditing in-store sales transactions when a digital receipt is issued. A receipt application server formulates a digital receipt from digital receipt data received from a POS system. The digital receipt is sent from the receipt application server to an auditor mobile device at the location of the POS system. A human auditor can view the digital receipt during an in-store audit. In some embodiments, one or both of the receipt application server and the auditor mobile device reorder receipt entries so that items having specified characteristics are presented more prominently on a display. For example, receipt entries can be re-ordered such that higher profit margin items, bulkier items, or more likely to be stolen items are presented more prominently. As such, a human auditor is more likely to expressly audit these types of items.

20 Claims, 19 Drawing Sheets

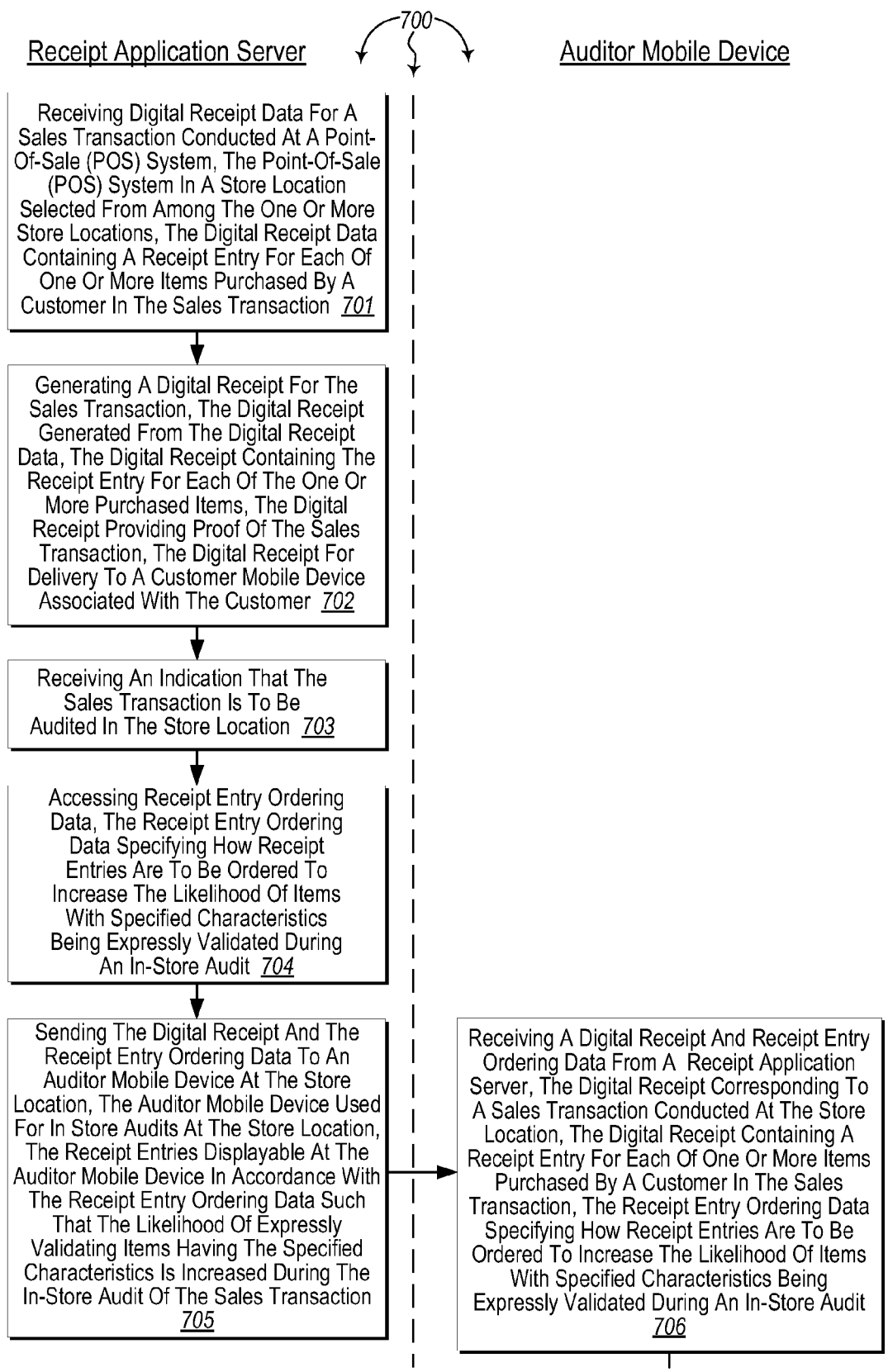

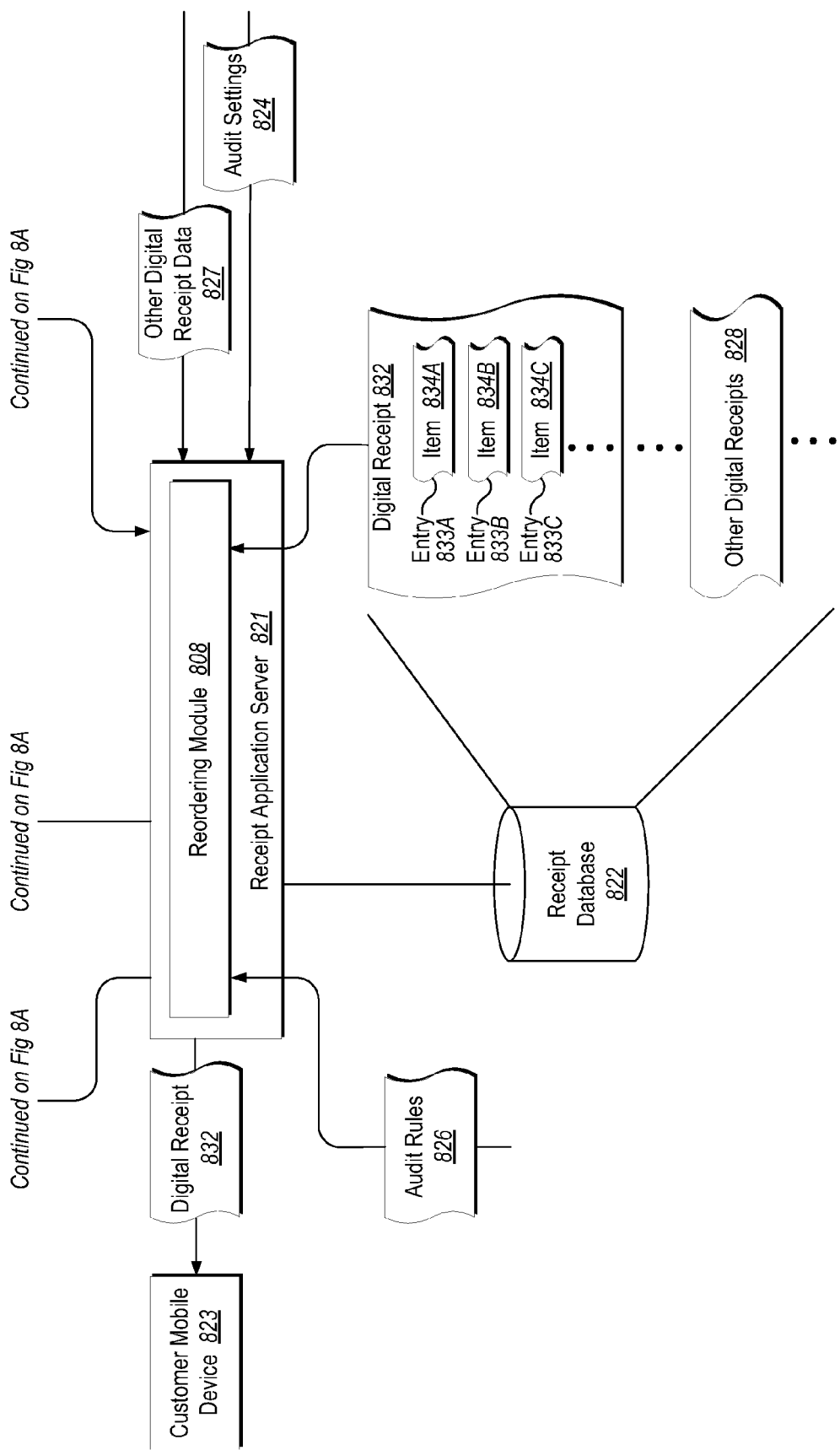

LOCATING AND ORGANIZING DIGITAL RECEIPT DATA FOR USE IN IN-STORE AUDITS

RELATED APPLICATIONS

This application is related to U.S. application Ser. No. 13/601,687, filed Aug. 31, 2012, U.S. application Ser. No. 13/601,715, filed Aug. 31, 2012, and U.S. application Ser. No. 13/601,753, filed Aug. 31, 2012.

BACKGROUND

1. Field of the Invention

This invention relates generally to the field of electronic sales transactions, and, more particularly, to locating and organizing digital receipt data for use in in-store audits.

2. Related Art

In a variety of transactions, customers or buyers of goods or services typically receive receipts from their respective merchants or service providers as proof of existence of conducted transactions. Generally, receipts are issued by merchants and service providers for a number of reasons including, for example, regulatory or tax reasons and convenience purposes. A receipt provides information about a corresponding transaction for the purpose of providing all participants with a trace or record of the transaction. Receipts can later be used by a consumer for various purposes including, for example, proving participation in a transaction for tax reporting purpose, product returns, use as a claim ticket for a further transaction, provisioning warranties, etc. Merchants can issue receipts to a customer in digital and/or paper format.

Some merchants also audit customers on exit to mitigate shoplifting, check for cashier errors, etc. To conduct an exit audit, a human auditor reviews items in the customer's cart, sack, etc. and compares items in the customer's possession to items listed on the customer's receipt to verify that items were indeed purchased.

A number of factors limit the amount of time that can be allocated for auditing an individual customer. For example, depending on the number of auditors, how busy a store is, a merchant's desire to allow customers to efficiently exit a store, etc. a human auditor may have from a few seconds up to a minute to audit each individual customer. Due at least in part to these time limitations, a human auditor typically verifies only a few items at most when conducting an exit audit for a customer.

Since a few items at most are verified, exit audits often produce marginal results. Items on a receipt can be listed in a random order (e.g., the order the cashier scanned the items) making it difficult for a human auditor to efficiently verify an item was purchased. As such, items that are less important to audit, for example, cheaper items or lower profit margin items may be listed on parts of the receipt that are more efficient for a human auditor to view (e.g., near the top, on the first page, etc.). On the other hand, items that are more important to audit, for example, more expensive items, higher profit margins items, or items with increased likelihood of being stolen may be listed on parts of the receipt that are less efficient for a human auditor to view (e.g., in the middle or bottom, on subsequent pages, etc.). When it is less efficient to view important items, fewer important items can be audited in an allotted time. Thus, an exit audit may verify the purchase of at least some cheaper or lower profit margin items at the expense of overlooking more expensive items or items that are more likely to be stolen.

Further, exit audits are also somewhat annoying and intrusive to customers. A customer may wait in one line to checkout. After checkout, the customer may find they have to wait in another line to get audited. When a human auditor is eventually reached, the customer is asked to produce a receipt. The customer must then wait while the auditor verifies items in a cart, sack, etc. against the produced receipt.

Audits based on digital receipts can be even more intrusive to a customer and also more difficult for a human auditor to conduct. For example, to conduct an audit based on a digital receipt, the auditor may request to view the digital receipt on a customer's mobile device (e.g., a mobile phone). This is intrusive to the customer as they are being asked to show the contents of their mobile device to a stranger. It may also be that the mobile device the digital receipt was sent to is not in the customer's possession, has a dead battery, etc.

If a digital receipt is presented, a human auditor may be able to view the digital receipt only for a moment and then must verify items from the digital receipt. Further, a mobile device may lack sufficient screen size to display an entire digital receipt at once. Thus, only a portion of a digital receipt may be visible on the mobile device when shown to the human auditor. User interaction (e.g., scrolling to a next page, etc.) may be required for other portions of a digital receipt to be displayed. However, the mobile device is property of the customer. As such, the human auditor has no right to take possession of the mobile phone to access other portions of the digital receipt. Thus, the human auditor has to perform an audit based on viewed items, which may less desirable items to audit relative to other items.

Further, many states in the United States do not require a customer to prove that they have purchased anything. As such, a customer may refuse to comply with a request to hand over a receipt or provide a view of a receipt.

BRIEF DESCRIPTION OF THE DRAWINGS

The specific features, aspects and advantages of the present invention will become better understood with regard to the following description and accompanying drawings where:

FIGS. 7A and 7B illustrate a flow chart of an example method for locating and reordering digital receipt data for use in an in-store audit.

FIGS. 8A and 8B illustrate an example computer architecture that facilitates reordering and locating digital receipt data for use in an in-store audit.

DETAILED DESCRIPTION

Figure 1:
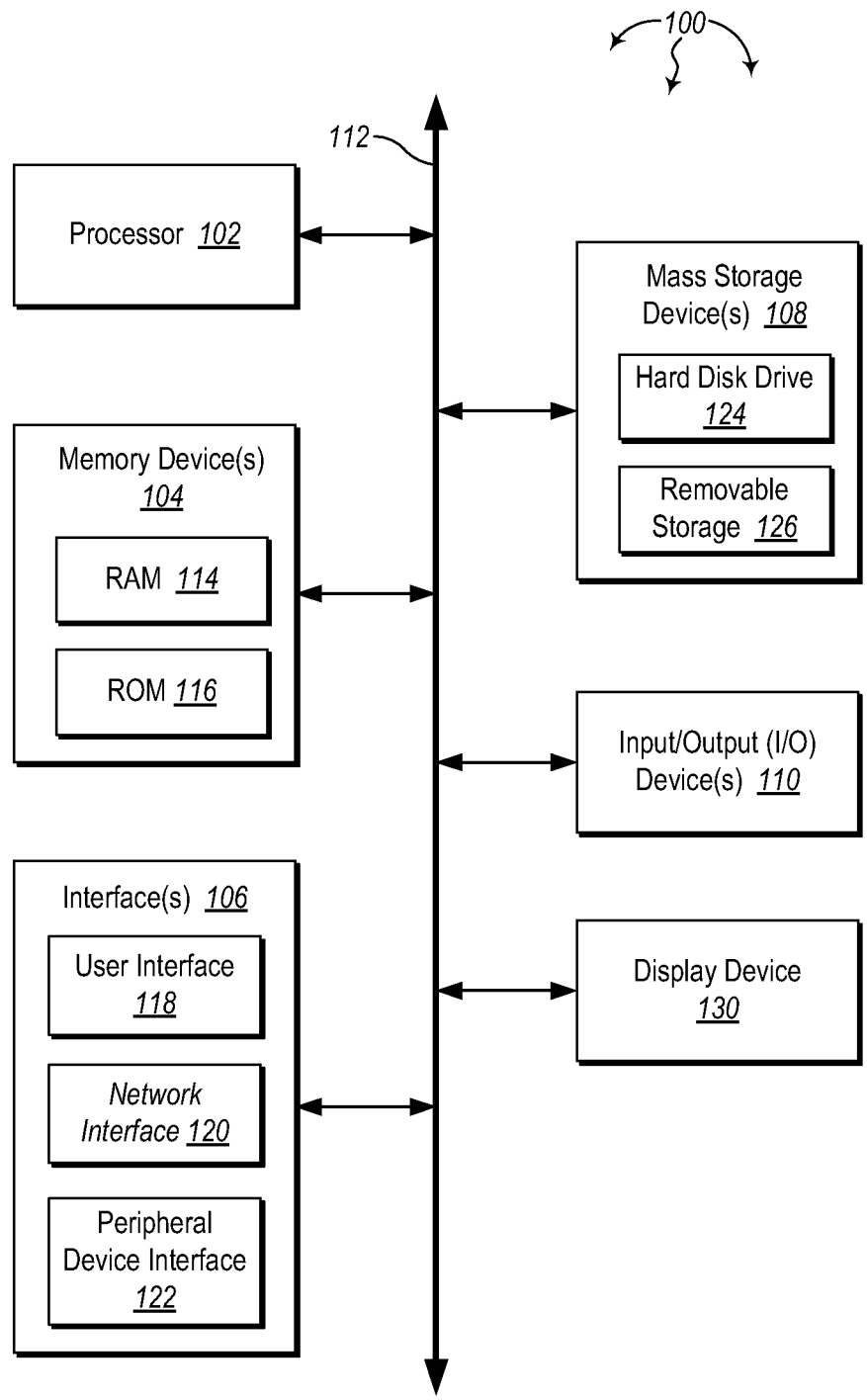
FIG. 1 illustrates an example block diagram of a computing device.

The present invention extends to methods, systems, and computer program products for locating and organizing digital receipt data for use in in-store audits. In the following description of the present invention, reference is made to the accompanying drawings, which form a part hereof, and in which is shown by way of illustration specific embodiments in which the invention is may be practiced. It is understood that other embodiments may be utilized and structural changes may be made without departing from the scope of the present invention.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Databases and servers described with respect to the present invention can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

In general, embodiments of the invention are directed to locating and organizing digital receipt data for use in in-store audits. Upon the close of a customer sales transaction at a location, digital receipt data for the sales transaction is sent to a receipt application server for storage. The receipt application server formulates a digital receipt from the digital receipt data. The digital receipt is subsequently sent from the receipt application server to an auditor mobile device at the location (and possibly also to customer mobile device). Receipt entries from the digital receipt can be presented at the auditor mobile device. A human auditor can view the presented receipt entries at the auditor mobile device and match the digital receipt to the customer. The human auditor can also use the displayed receipt entries (as well as other receipt entries contained in the digital receipt) to audit customer merchandise upon the customer exiting the location.

In some embodiments, receipt entries contained in a digital receipt are re-ordered for presentation at the auditor mobile device. Re-ordering can occur at the auditor mobile device and/or at the receipt application server based on audit rules. The audit rules can be stored at the auditor mobile device or at the receipt application server. Receipt entries can be re-ordered such that receipt entries for items having specified characteristics are presented more prominently (e.g., at the top, highlighted, etc.). For example, receipt entries can be re-ordered such that higher profit margin items, bulkier items, or more likely to be stolen items are presented more prominently. As such, a human auditor is more likely to expressly audit these types of items.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc, networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2A:
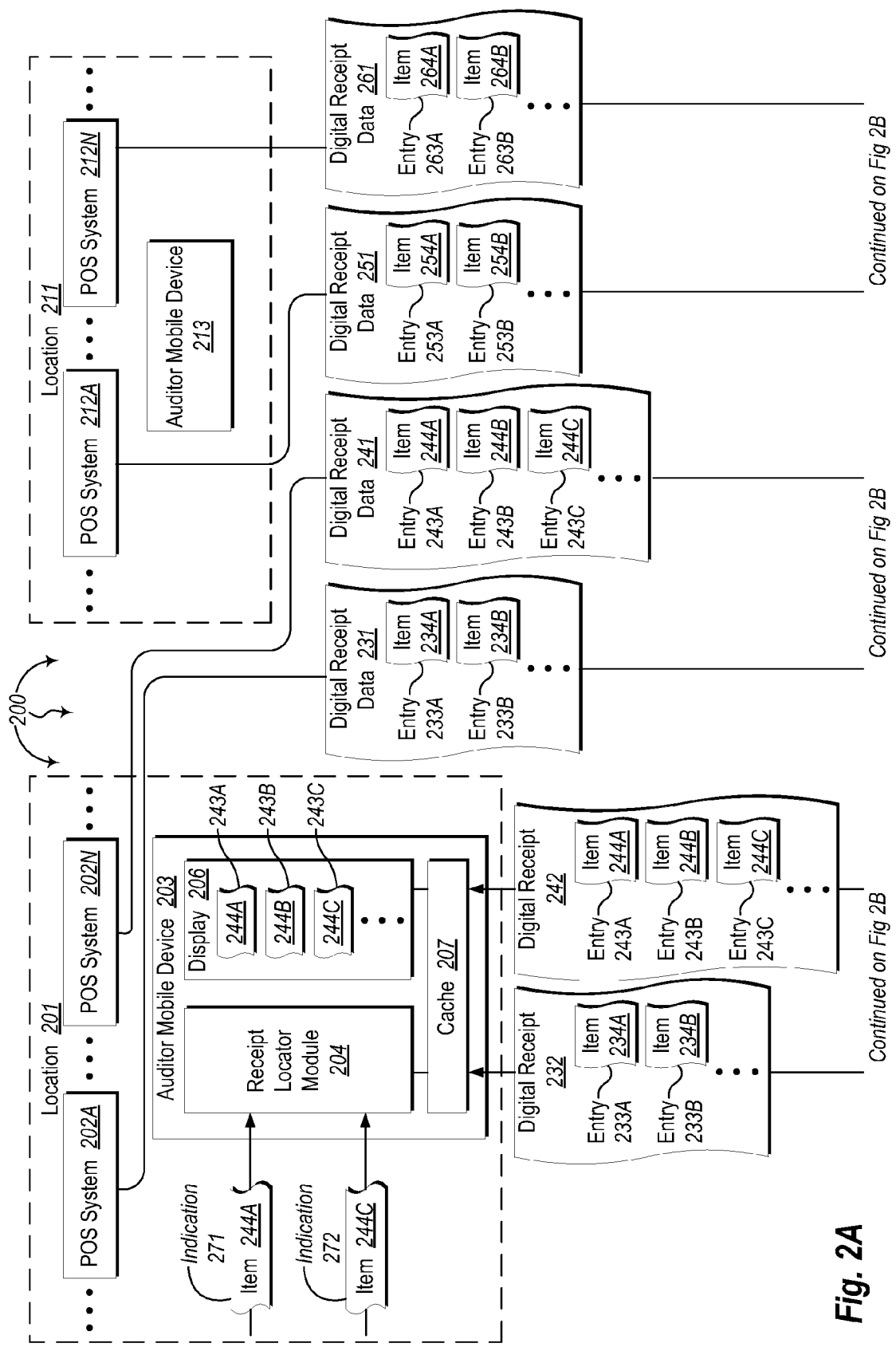
FIG. 2 illustrates an example computer architecture that facilitates locating digital receipt data for use in in-store audits.
Figure 2B:
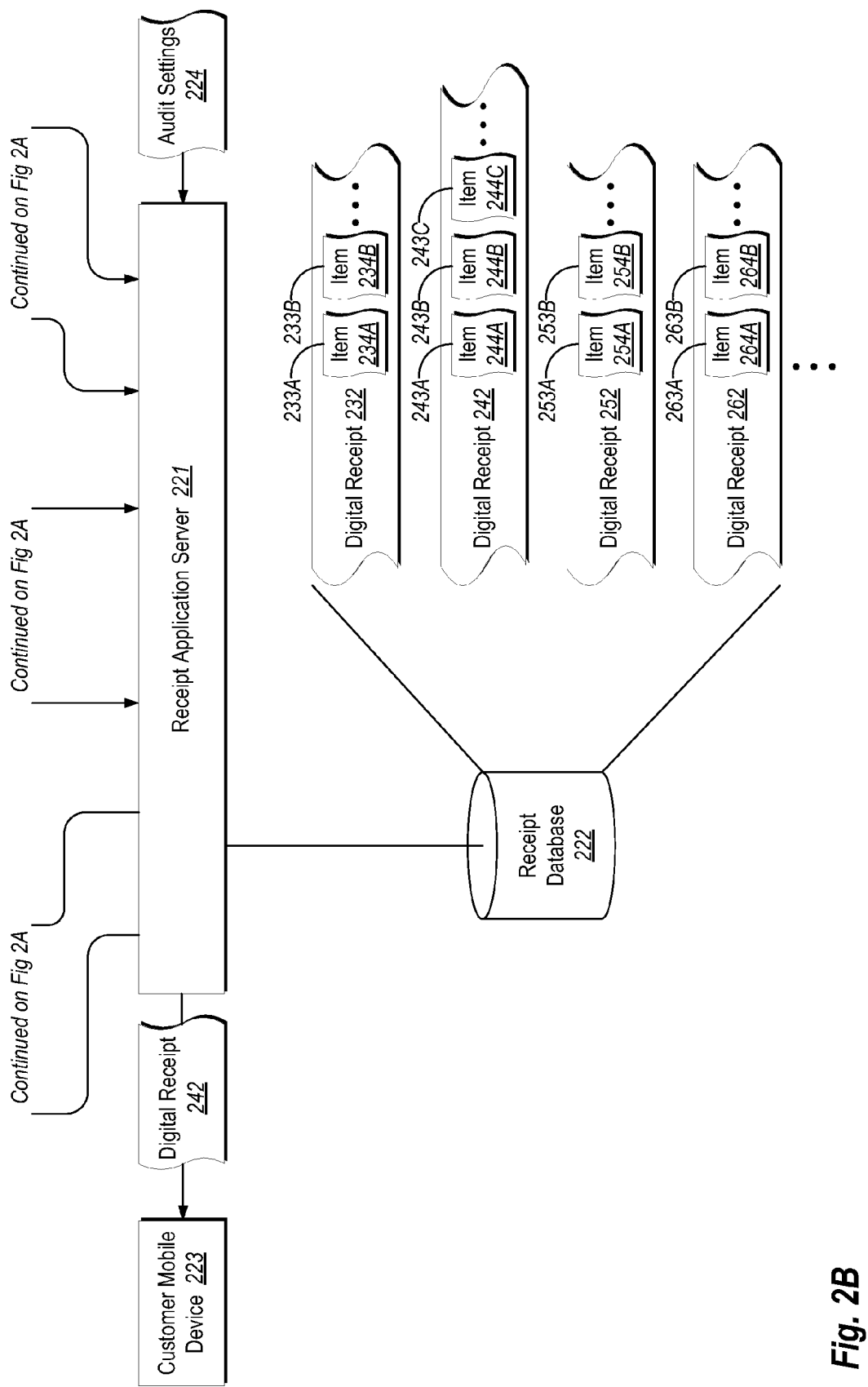

FIGS. 2A and 2B illustrates an example computer architecture 200 that facilitates locating digital receipt data for use in in-store audits. Referring to FIGS. 2A and 2B, computer architecture 200 includes POS systems 202A-202N, auditor mobile device 203, POS systems 212A-212N, auditor mobile device 213, receipt application server 221, and customer mobile device 223. Each of the depicted systems, servers, and devices as well as their respective components can be connected to one another over (or be part of) a network, such as, for example, a PAN, a LAN, a WAN, and even the Internet. Accordingly, each of the depicted components as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

POS systems 202A-202N, auditor mobile device 203, POS systems 212A-212N, auditor mobile device 213, and receipt application server 221 can be commonly owned by a merchant or retailer that operates a chain of stores. Locations 201 and 211 can be physical store locations for the merchant or retailer. Locations 201 and 211 can be geographically diverse, such as, for example, in different cities, states, or countries. The merchant or retailer can also have one or more other physical store locations (not depicted in FIG. 2). The ellipses before, between, and after POS systems 202A-202N and POS systems 212A-212N represent that one or more additional POS systems can be included at location 201 and/or at location 211.

Each POS system, including POS systems 202A-202N and POS systems 212A-212N can be physically located at a checkout lane in a corresponding location. Each POS system, including POS systems 202A-202N and POS systems 212A-212N can include a transaction processor, communication modules and adapters, and I/O peripherals.

Generally, a transaction processor is configured to manage sales transactions for a POS system. The transaction processor can receive input from I/O peripherals to open a sales transaction, collect digital receipt data (e.g., date, time, item, and cost data, etc.) for the sales transaction, and close the sales transaction. An item database can store item data for items sold by a retailer or merchant. For example, an item database can store item description data, item cost data, item size (bulkiness) data, item profit margin data, item theft statistics, etc. for a plurality of items. Digital receipt data for an item (e.g., item description and item cost) can be retrieved from the item database in response to scanning a barcode on (or otherwise identifying) the item. Other item data can be used internally by the merchant or retailer but not necessarily for the generation of digital receipts.

I/O peripherals can include one or more of: a monitor (e.g., a cashier-facing monitor), one or more input devices (e.g., scanners, keyboards, scales, or the like), one or more payment devices (e.g., cash drawers, card readers, etc.) for receiving or returning payments, and one or more output devices (e.g., customer-facing display or monitor, receipt printer, etc.).

Communication modules and adapters can include wired and/or wireless networking components for connecting the POS system with a network, such as, for example, a Wi-Fi and/or wired Ethernet network, that facilitates further connections (e.g., to the Internet).

Accordingly, when a sales transaction is closed, a POS system in a particular location can use communication modules and adapters to send digital receipt data to receipt application server 221. For example, POS systems in location 201 can send digital receipt data to receipt application server 221. More particularly, POS system 202A can send receipt data 231, including entries 233A, 233B, etc. for items 234A, 234B, etc. respectively, to receipt application server 221. Likewise, POS system 202N can send receipt data 241, including entries 243A, 243B, 243C, etc. for items 244A, 244B, 244C, etc. respectively, to receipt application server 221.

Similarly, POS systems in location 211 can send digital receipt data to receipt application server 221. More particularly, POS system 212A can send receipt data 251, including entries 253A, 253B, etc. for items 254A, 254B, etc. respectively, to receipt application server 221. Likewise, POS system 212N can send receipt data 261, including entries 263A, 263B, etc. for items 264A, 264B, etc. respectively, to receipt application server 221.

Receipt database 222 can receive digital receipt data from POS systems at various different store locations, including locations 201 and 211. Receipt database 222 can formulate digital receipts from received receipt data. Formulated digital receipts can include entries for items included in corresponding digital receipt data (but potentially in a different format, for example, a format deliverable to mobile devices). Receipt database 222 can store formulated digital receipts in receipt database 222. For example, receipt application server 221 can formulate and store digital receipts 232, 242, 252, and 262 from digital receipt data 231, 241, 251, and 261 respectively and store digital receipts 232, 242, 252, and 262 in receipt database 222.

As such, in some embodiments, receipt data server 221 is part of a backend system that receives receipt data from a plurality of POS systems distributed throughout different geographic locations. The plurality of POS systems and the backend system can be part of a commonly owned and/or controlled corporate network infrastructure.

Subsequent to storing digital receipts, receipt application server 221 can send stored digital receipts to customer and/or auditor mobile devices, such as, for example, smartphones and/or tablets. Receipt application server 221 can send digital receipts to a mobile device in response to a request and/or in accordance with configured settings. For example, in response to a request for receipts from customer mobile device 223, receipt application server 221 can send digital receipt 242 to customer mobile device 223. Alternately or in combination, receipt application server 221 can send digital receipts 232 and 242 to zero or more auditor devices, such as, for example, auditor mobile device 203, in accordance with audit settings 224. Sending digital receipts from receipt application server 221 to zero or more auditor devices can involve push or polled mechanisms. Receipt application server 221 can send digital receipts in a web or native view. Audit settings 224 can indicate how and when to delivery digital receipts to a merchant's or retailer's store locations for use in conducting customer audits (e.g., auditing a customer's possessed merchandise as they leave a physical store location).

In some embodiments, POS systems attach a location identifier to digital receipt data sent to receipt application server 221. Audit settings 224 can include mappings between auditor mobile devices and location identifiers. Receipt application server 221 can use the mappings to delivery digital receipts back to an auditor mobile device at the same location where a sales transaction occurred.

For example, POS systems 202A-202N can attach a location identifier for location 201 to digital receipt data 231 and 241. Audit settings 224 can include a mapping between the location identifier and auditor mobile device 203 (an auditor mobile device for location 201). Receipt application server 221 can use the mapping to send corresponding digital receipts (i.e., digital receipts 232 and 242) back to auditor mobile device 203. Similarly, POS systems 212A-212N can attach a location identifier for location 211 to digital receipt data 251 and 261. Audit settings 224 can include a mapping between the location identifier and auditor mobile device 213 (an auditor mobile device for location 211). Receipt application server 221 can use the mapping to send corresponding digital receipts (i.e., digital receipts 252 and 262) back to auditor mobile device 213.

As depicted, auditor mobile device 203 further includes receipt locator module 204, display 206, and cache 207. Auditor mobile device 213 can include similar or even identical components. In general, an auditor mobile device can receive digital receipts from receipt application server 221. The auditor mobile device can cache received digital receipts locally for use in conducting customer audits. For example, auditor mobile device 203 can cache digital receipts received from receipt application server 221 in cache 207 (e.g., system memory, a flash drive, or other storage).

An auditor mobile device can cache a digital receipt in accordance with a caching policy for a specified time period before the digital receipt is removed. The caching policy can be configured so that there is a high likelihood of a digital receipt for a sales transaction still being cached when a customer that participated in the sales transaction reaches a location where an audit is to occur. The caching policy can also be configured so that a portion of cache remains available for new digital receipts. In some embodiments, the specified time period is in a range from 5-30 minutes.

A receipt locator module at an auditor mobile device can locate digital receipts from within cache based on one or more identified items. For example, a human auditor can scan a barcode or key in information for one more items in a customer's possession. The receipt locator module can search the cache to locate a digital receipt that includes (matches) an entry for each of the one or more items. Matching one or more identified items to one or more entries of a digital receipt provides some degree of certainty that a located digital receipt corresponds to the customer. For example, receipt locator module 204 can search cache 207 to locate digital receipts that include entries for items identified at auditor mobile device 203.

Matched as well additional entries from a located digital receipt can then be presented at a display device for use in conducting an in-store audit. A human auditor can refer to the presented entries to audit (e.g., matched and/or additional) items in the customer's possession. For example, matched and additional entries from digital receipts located in cache 207 can be presented at display 206. A human auditor at location 201 can refer to the entries presented at display 206 to perform an in-store audit of a customer. During display of digital receipt entries at display 206, some parts of a digital receipt can be hidden from the human auditor's view to ensure customer privacy.

Prior to use of auditor mobile device 203 by a human auditor, the human auditor can authenticate on auditor mobile device 203. The human auditor can then select a store location, for example, based on geolocation.

Figure 3A:
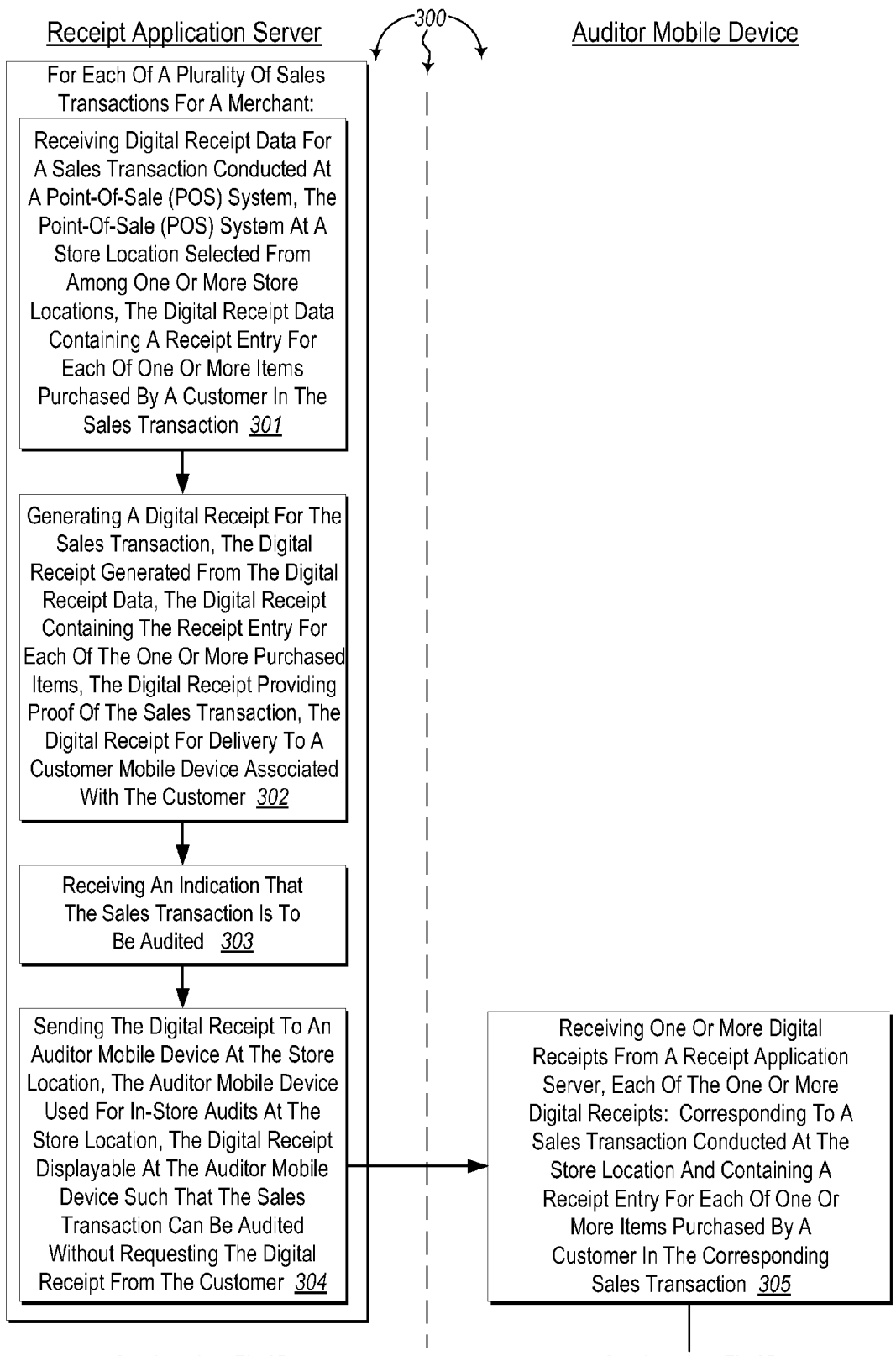
FIGS. 3A and 3B illustrate a flow chart of an example method for locating digital receipt data for use in in-store audits.
Figure 3B:
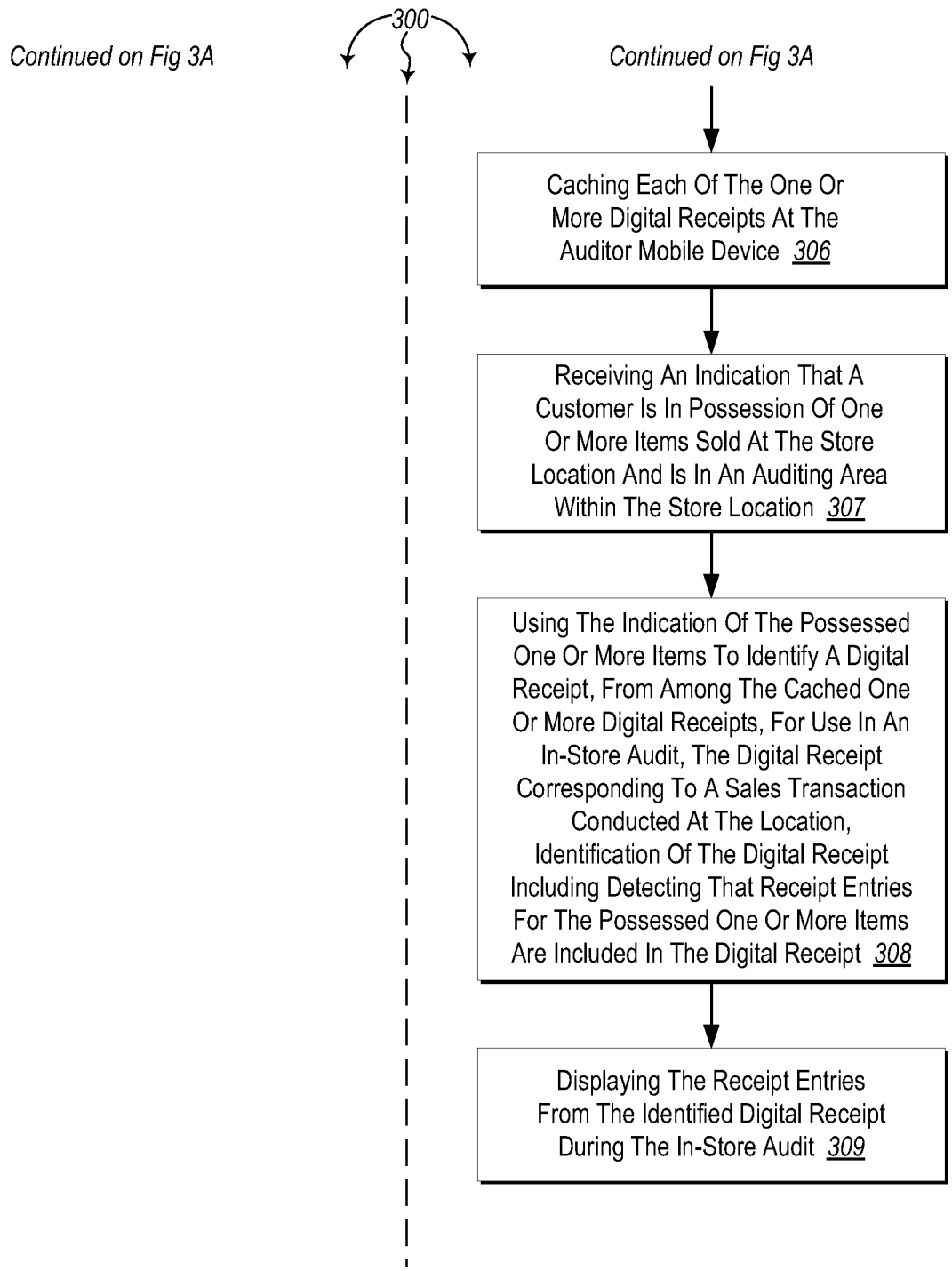

FIGS. 3A and 3B illustrate a flow chart of an example method 300 for locating digital receipt data for use in in-store audits. Method 300 will be described with respect to the components and data of computer architecture 200.

For each of a plurality of sales transactions for a merchant, method 300 includes receiving digital receipt data for a sales transaction conducted at a Point-Of-Sale (POS) system, the Point-Of-Sale (POS) system at a store location selected from among one or more store locations, the digital receipt data containing a receipt entry for each of one or more items purchased by a customer in the sales transaction (301). For example, receipt application server 221 can receive digital receipt data 231 and 241 for sales transactions conducted at POS systems 202A and 202N respectively. As depicted, receipt data 231, includes entries 233A, 233B, etc. for items 234A, 234B, etc. respectively purchased by a customer in a sales transaction at POS system 202A. Likewise, receipt data 241 includes entries 243A, 243B, 243C, etc. for items 244A, 244B, 244C, etc. respectively purchased by a customer in a sales transaction at POS system 202N.

Similarly, receipt application server 221 can receive digital receipt data 251 and 261 for sales transactions conducted at POS systems 212A and 212N respectively. Receipt data 251 includes entries 253A, 253B, etc. for items 254A, 254B, etc. respectively purchased by a customer in a sales transaction at POS system 212A. Receipt data 261, includes entries 263A, 263B, etc. for items 264A, 264B, etc. respectively purchased by a customer in a sales transaction at POS system 212N.

Ellipsis within digital receipt data represents that entries for one or more additional items can be included in the digital receipt data.

For each of a plurality of sales transactions for the merchant, method 300 includes generating a digital receipt for the sales transaction, the digital receipt generated from the digital receipt data, the digital receipt containing the receipt entry for each of the one or more purchased items, the digital receipt providing proof of the sales transaction, the digital receipt for delivery to a customer mobile device associated with the customer (302). For example, receipt application server 221 can generate digital receipts 232, 242, 252, and 262 from digital receipt data 231, 241, 251, and 261 respectively for the sales transactions at POS systems 202A, 202N, 212A, and 212N respectively. Digital receipts 232, 242, 252, and 262 can be stored in receipt database 222.

Digital receipts 232, 242, 252, and 262 provide proof of the sales transactions conducted at POS systems 202A, 202N, 212A, and 212N respectively. Digital receipts 232, 242, 252, and 262 can be delivered to customer mobile devices to provide customers with a record of the sales transactions. For example, digital receipt 242 can be delivered to customer mobile device 223 (e.g., a mobile device associated with the customer that conducted the sales transaction at POS system 202N)

For each of a plurality of sales transactions for the merchant, method 300 includes receiving an indication that the sales transaction is to be audited (303). For example, receipt application server 221 can receive an indication that the sales transactions corresponding to digital receipts 232, 242, 252, and 262 are to be audited. In some embodiments, receipt application server is configured to audit all sales transactions. In other embodiments, receipt application server 221 refers to audit settings 224 to determine if a sales transaction is to be audited. Audit settings 224 can indicate that digital receipts with entries for specified items (e.g., higher profit margin items, bulkier items, items that are more likely to be stolen, etc.) are to audited, can indicate that digital receipts are to be randomly audited, can indicate that digital receipts are to be audited at specified dates and/or times, can indicate that digital receipts are to be audited based on the number of entries in a digital receipt, etc.

For each of a plurality of sales transactions for the merchant, method 300 includes sending the digital receipt to an auditor mobile device at the store location, the auditor mobile device used for in-store audits at the store location, the digital receipt displayable at the auditor mobile device such that the sales transaction can be audited without requesting the digital receipt from the customer (304). For example, receipt application server 221 can send digital receipts 232 and 242 to auditor mobile device 203. Digital receipts 232 and 242 are displayable at display 206. As such, the sales transactions corresponding to digital receipts 232 and 242 can be audited without having to request digital receipt 232 or 242 from a customer.

Similarly (but not depicted), receipt application server 221 can send digital receipts 252 and 262 to auditor mobile device 213. Digital receipts 252 and 262 are displayable at display of auditor mobile device 213. As such, the sales transactions corresponding to digital receipts 252 and 262 can be audited without having to request digital receipt 252 or 262 from a customer.

Method 300 includes receiving one or more digital receipts from the receipt application server, each of the one or more digital receipts: corresponding to a sales transaction conducted at the store location and containing a receipt entry for each of one or more items purchased by a customer in the corresponding sales transaction (305). For example, auditor mobile device 203 can receive digital receipts 232 and 242 from receipt application server 221. As described, digital receipts 232 and 242 correspond to sales transactions conducted at location 201 and contain entries for items purchased by a customer in the corresponding sales transactions. For example, digital receipt 232 contains entries 233A, 233B, etc. for items 234A, 234B, etc. respectively purchased by a customer in the sales transaction conducted at POS system 202A. Likewise, digital receipt 242 contains entries 243A, 243B, 243C, etc. for items 244A, 244B, 244C, etc. respectively purchased by a customer in the sales transaction conducted at POS system 202N.

Method 300 includes caching each of the one or more digital receipts at the auditor mobile device (306). For example, auditor mobile device 203 can cache digital receipts 232 and 242 in cache 207. Method 300 includes receiving an indication that a customer is in possession of one or more items sold at the store location and is in an auditing area within the store location (307). For example, receipt locator module 204 can receive indication 271 and/or indication 272 indicating that a customer is in possession of item 244A and/or item 244C. Indications 271 and 272 can be received from a peripheral device, such as, for example, a barcode scanner or keyboard, connected to auditor mobile device 203. For example, a human auditor can scan a barcode on an item in a customer's possession (e.g., in a shopping cart).

Auditor mobile device 203 can be stationed at a specified audit area within location 211 (e.g., somewhere in a path between checkout lanes and a store exit). Thus, when an item is indicated to auditor mobile device 203, auditor mobile device 203 views the customer possessing the item to be within the specified audit area.

Method 300 includes using the indication of the possessed one or more items to identify a digital receipt, from among the cached one or more digital receipts, for use in an in-store audit, the digital receipt corresponding to a sales transaction conducted at the location, identification of the digital receipt including detecting that receipt entries for the possessed one or more items are included in the digital receipt (308). For example, receipt locator module 204 can use indication 271 and/or indication 272 to identify digital receipt 242, from among digital receipts cached in cache 207, for use in an in-store audit at location 201. To identify digital receipt 242, receipt locator module 204 can detect that digital receipt 242 includes entry 243A for item 244A and/or can detect that digital receipt 242 includes entry 243C for item 244C.

That is, one or more items identified in a customer's possession (by indications 271 and 272) are listed in a cached digital receipt (digital receipt 242). As such, auditor mobile device 203 has some level of certainty that the cached digital receipt (digital receipt 242) corresponds to the customer's sales transaction and that the cached digital receipt (digital receipt 242) lists other purchased items that are to be in the customer's possession.

Method 300 includes displaying the receipt entries from the identified digital receipt during the in-store audit (309). For example, auditor mobile device 203 can display entries 243A, 243B, 243C, etc. at display 206. Entries 243A, 243B, 243C, etc. can be displayed at display 206 during an in-store audit of the customer in possession of item 244A and/or 244C. A human auditor can refer to display 206 during the in-store audit of the customer. The human auditor can check if the customer is in possession of any items not listed in digital receipt 242 (e.g., the customer is attempting to steal an item). The human auditor can also check if the customer lacks possession of any items listed in digital receipt 242 (e.g., the customer left an item at a checkout lane).

During an audit or when an audit is complete, the human auditor can indicate that they are satisfied with the outcome of the audit. For example, the human auditor can indicate that one or more items in a customer's possession where audited and found to be listed on the customer's receipt. When a human auditor is satisfied with the outcome of an audit, the human auditor can indicate to auditor mobile device 203 that a transaction was satisfactorily audited.

On the other hand, during an audit or when an audit is complete, the human auditor can indicate that they are not satisfied with audit. For example, the human auditor may find one or more items in a customer's possession that are not listed on the customer's receipt. When a human auditor is not satisfied with an audit, the human auditor can indicate to auditor mobile device 203 that there is a problem with the auditor. Alternately, the human auditor can call other employees to assist. For example, an unsatisfactory audit can be escalated to more senior staff for performance of other measures, such as, for example, reviewing security footage.

Auditor mobile device 213 can repeat 305-309 to identify and display appropriate digital receipts for use in in-store audits at location 211.

Figure 4A:
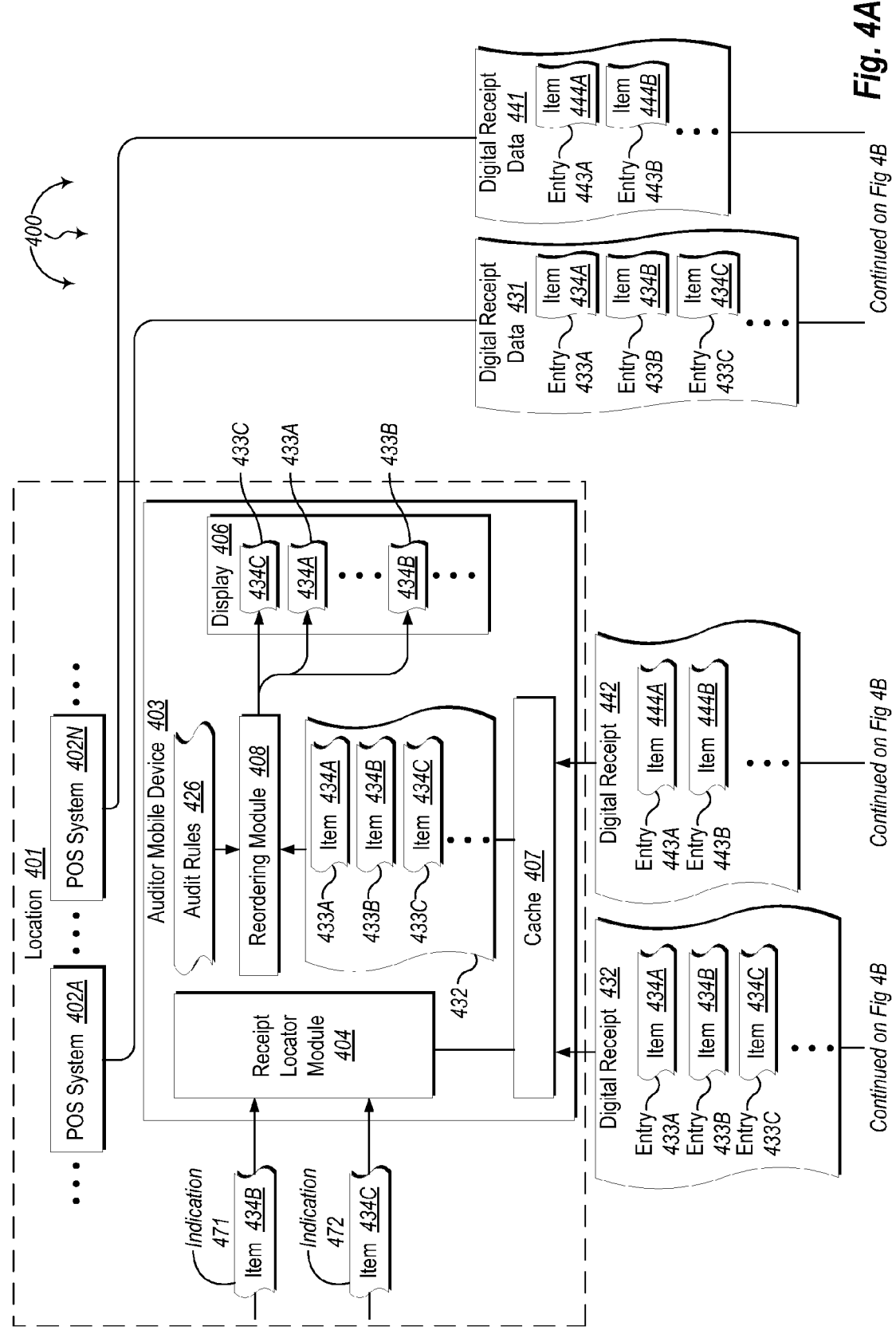
FIGS. 4A and 4B illustrate an example computer architecture that facilitates locating and reordering digital receipt data for use in an in-store audit.
Figure 4B:
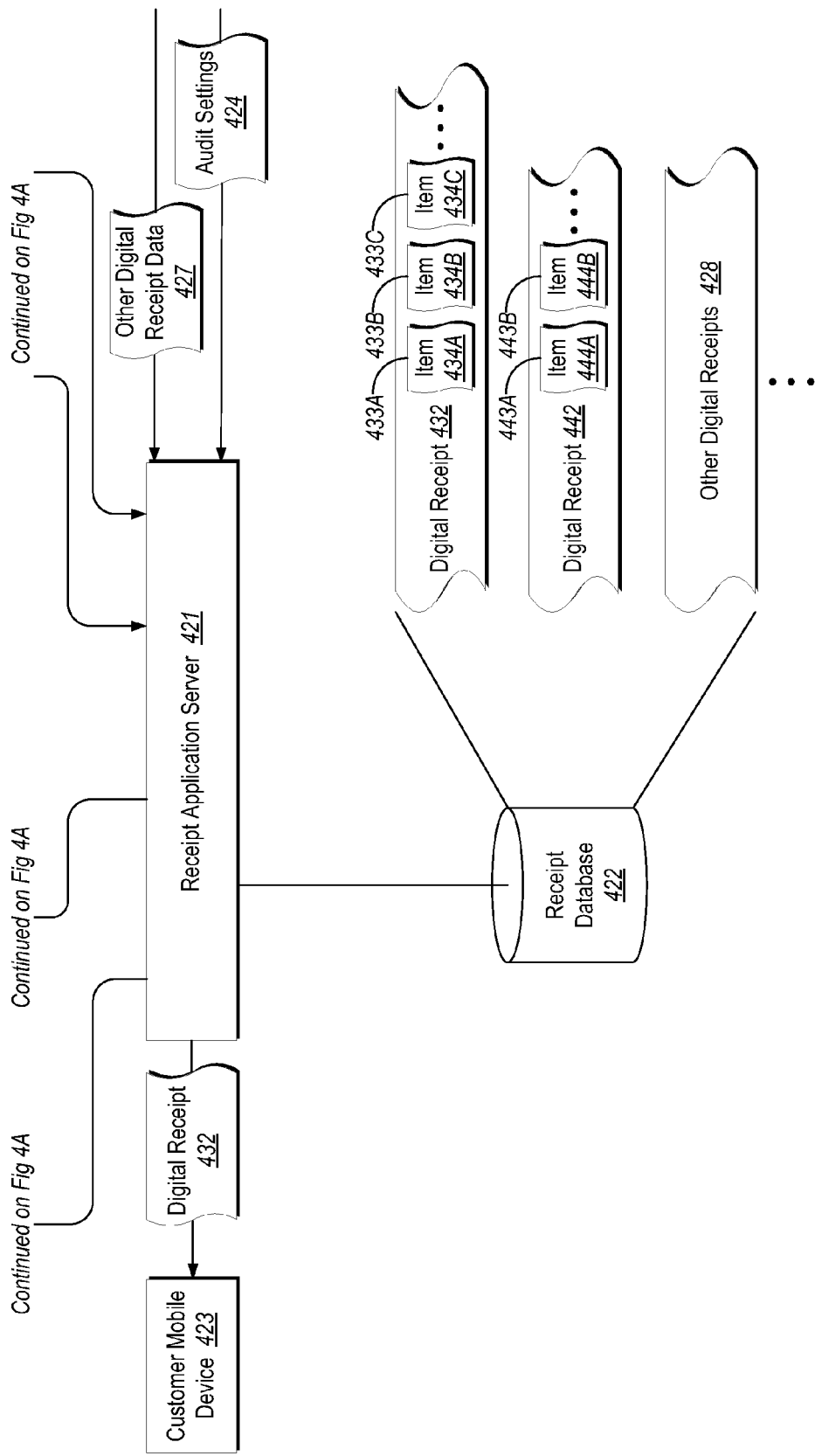

FIGS. 4A and 4B illustrates an example computer architecture 400 that facilitates locating and reordering digital receipt data for use in an in-store audit. Referring to FIGS. 4A and 4B, computer architecture 400 includes POS systems 402A-402N, auditor mobile device 403, receipt application server 421, and customer mobile device 423. Each of the depicted systems, servers, and devices as well as their respective components can be connected to one another over (or be part of) a network, such as, for example, a PAN, a LAN, a WAN, and even the Internet. Accordingly, each of the depicted components as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

POS systems 402A-402N, auditor mobile device 403, and receipt application server 421 can be commonly owned by a merchant or retailer that operates a chain of stores. Location 401 can be a physical store location for the merchant or retailer. The merchant or retailer can also have one or more other physical store locations (not depicted in FIG. 4). Location 401 and any other locations can be geographically diverse locations, such as, for example, in different cities, states, or countries. The ellipses before, between, and after POS systems 402A-402N represent that one or more additional POS systems can be included at location 401.

Each POS system, including POS systems 402A-402N can be physically located at a checkout lane. Each POS system, including POS systems 402A-402N can include a transaction processor, communication modules and adapters, and I/O peripherals.

Generally, a transaction processor is configured to manage sales transactions for a POS system. The transaction processor can receive input from I/O peripherals to open a sales transaction, collect digital receipt data (e.g., date, time, item, and cost data, etc.) for the sales transaction, and close the sales transaction. An item database can store item data for items sold by a retailer or merchant. For example, an item database can store item description data, item cost data, item size (bulkiness) data, item profit margin data, item theft statistics (how likely is the item to be stolen), etc. for a plurality of items. Digital receipt data for an item (e.g., item description and item cost) can be retrieved from the item database in response to scanning a barcode on (or otherwise identifying) the item. Other item data can be used internally by the merchant or retailer but not necessarily for the generation of digital receipts.

I/O peripherals can include one or more of: a monitor (e.g., a cashier-facing monitor), one or more input devices (e.g., scanners, keyboards, scales, or the like), one or more payment devices (e.g., cash drawers, card readers, etc.) for receiving or returning payments, and one or more output devices (e.g., customer-facing display or monitor, receipt printer, etc.).

Communication modules and adapters can include wired and/or wireless networking components for connecting the POS system with a network, such as, for example, a Wi-Fi and/or wired Ethernet network, that facilitates further connections (e.g., to the Internet).

Accordingly, when a sales transaction is closed, a POS system in a particular location can use communication modules and adapters to send digital receipt data to receipt application server 421. For example, POS systems in location 401 can send digital receipt data to receipt application server 421. More particularly, POS system 402A can send receipt data 431, including entries 433A, 433B, 433C etc. for items 434A, 434B, 4334C, etc. respectively, to receipt application server 421. Likewise, POS system 402N can send receipt data 441, including entries 443A, 443B, etc. for items 444A, 444B, etc. respectively, to receipt application server 421.

Receipt database 422 can receive digital receipt data from POS systems at various different store locations, including location 401. Receipt database 422 can formulate digital receipts from received receipt data. Formulated digital receipts can include entries for items included in corresponding digital receipt data (but potentially in a different format, for example, a format deliverable to mobile devices). Receipt database 422 can store formulated digital receipts in receipt database 422. For example, receipt application server 421 can formulate and store digital receipts 432 and 442 from digital receipt data 431 and 441 respectively. Receipt application server 421 can also formulate other digital receipts 428 for other receipt data 427 (e.g., digital receipt data from other store locations). Receipt application server 421 can store digital receipts 432, 434, and other receipts 428 in receipt database 422.

As such, in some embodiments, receipt data server 421 is part of a backend system that receives receipt data from a plurality of POS systems distributed throughout different geographic locations. The plurality of POS systems and the backend system can be part of a commonly owned and/or controlled corporate network infrastructure.

Subsequent to storing digital receipts, receipt application server 421 can send stored digital receipts to customer and/or auditor mobile devices, such as, for example, smartphones and/or tablets. Receipt application server 421 can send digital receipts to a mobile device in response to a request and/or in accordance with configured settings. For example, in response to a request for receipts from customer mobile device 423, receipt application server 421 can send digital receipt 432 to customer mobile device 423. Alternately or in combination, receipt application server 421 can send digital receipts 432 and 442 to zero or more auditor devices, such as, for example, auditor mobile device 403, in accordance with audit settings 424. Sending digital receipts from receipt application server 421 to zero or more auditor devices can involve push or polled mechanisms. Receipt application server 421 can send digital receipts in a web or native view. Audit settings 424 can indicate how and when to delivery digital receipts to a merchant's or retailer's store locations for use in conducting customer audits (e.g., auditing a customer's possessed merchandise as they leave a physical store location).

In some embodiments, POS systems attach a location identifier to digital receipt data sent to receipt application server 421. Audit settings 424 can include mappings between auditor mobile devices and location identifiers. Receipt application server 421 can use the mappings to delivery digital receipts back to an auditor mobile device at the same location where a sales transaction occurred.

For example, POS systems 402A and 402N can attach a location identifier for location 401 to digital receipt data 431 and 441 respectively. Audit settings 424 can include a mapping between the location identifier and auditor mobile device 403 (an auditor mobile device for location 401). Receipt application server 421 can use the mapping to send corresponding digital receipts (i.e., digital receipts 432 and 442) back to auditor mobile device 403. Audit settings 224 can also include mappings between location identifiers and auditor mobile devices in other locations (e.g., store locations that sent other digital receipt data 427). Receipt application server 421 can use the mappings to send corresponding digital receipts back to other auditor mobile devices.

As depicted, auditor mobile device 403 further includes receipt locator module 404, display 406, cache 407, and reordering module 408. In general, an auditor mobile device can receive digital receipts from receipt application server 421. The auditor mobile device can cache received digital receipts locally for use in conducting customer audits. For example, auditor mobile device 403 can cache digital receipts received from receipt application server 421 in cache 407 (e.g., system memory, a flash drive, or other storage).

An auditor mobile device can cache a digital receipt in accordance with a caching policy for a specified time period before the digital receipt is removed. The caching policy can be configured so that there is a high likelihood of a digital receipt for a sales transaction still being cached when a customer that participated in the sales transaction reaches a location where an audit is to occur. The caching policy can also be configured so that a portion of cache remains available for new digital receipts. In some embodiments, the specified time period is in a range from 5-30 minutes.

A receipt locator module at an auditor mobile device can locate digital receipts from within cache based on one or more identified items. For example, a human auditor can scan a barcode or key in information for one more items in a customer's possession. The receipt locator module can search the cache to locate a digital receipt that includes (matches) an entry for each of the one or more items. Matching one or more identified items to one or more entries of a digital receipt provides some degree of certainty that a located digital receipt corresponds to the customer. For example, receipt locator module 404 can search cache 407 to locate digital receipts that include entries for items identified at auditor mobile device 403.

A reordering module can refer to audit rules to determine how matched as well as additional entries from located digital receipts are to be ordered for presentation at a display device. For example, reordering module 408 can refer to audit rules 426 to determine how entries from located receipts are to be ordered for presentation at display 406. Audit rules can indicate how to reorder entries of a digital receipt for display based on items characteristics. For example, audit rules can indicate that items with higher profit margins, larger (or bulkier) items, items that are more likely to be stolen, etc. are to be presented more prominently at a display.

Reordered entries from a located digital receipt can then be presented at a display device for use in conducting an in-store audit. A human auditor can refer to the presented entries to audit (e.g., matched and/or additional) items in the customer's possession. For example, reordered entries from digital receipts located in cache 407 can be presented at display 406. A human auditor at location 401 can refer to the entries presented at display 406 to perform an in-store audit of a customer. During display of digital receipt entries at display 406, some parts of a digital receipt can be hidden from the human auditor's view to ensure customer privacy.

The human auditor may also chose to apply different audit priorities after viewing reordered receipt entries. For example, if receipt entries where initially ordered by profit margin, the human auditor may choose to reorder based on bulk or likelihood of theft.

Prior to use of auditor mobile device 403 by a human auditor, the human auditor can authenticate on auditor mobile device 403. The human auditor can then select a store location, for example, based on geolocation.

Figure 5A:
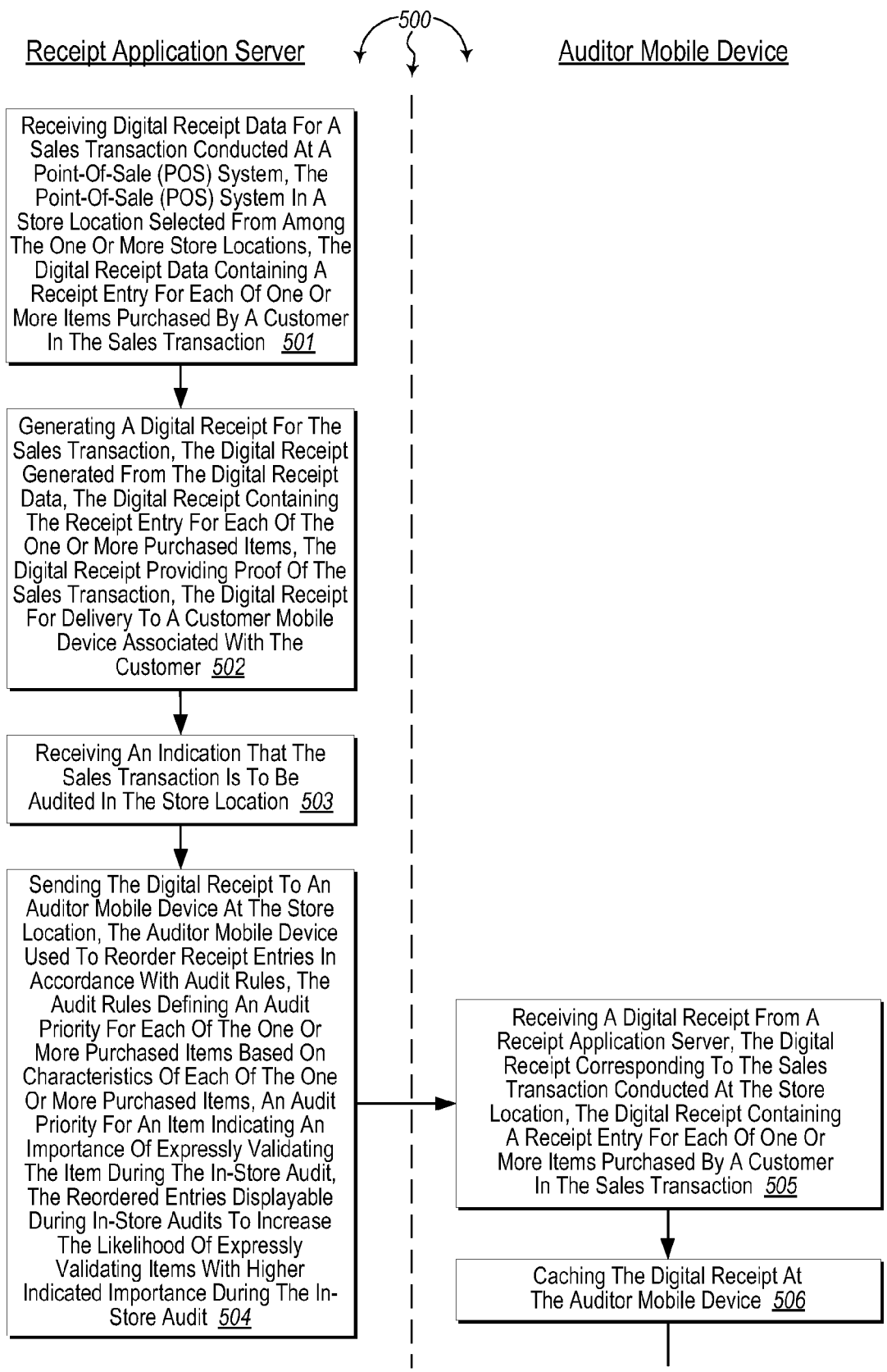
FIGS. 5A and 5B illustrate a flow chart of an example method for locating and reordering digital receipt data for use in an in-store audit.
Figure 5B:
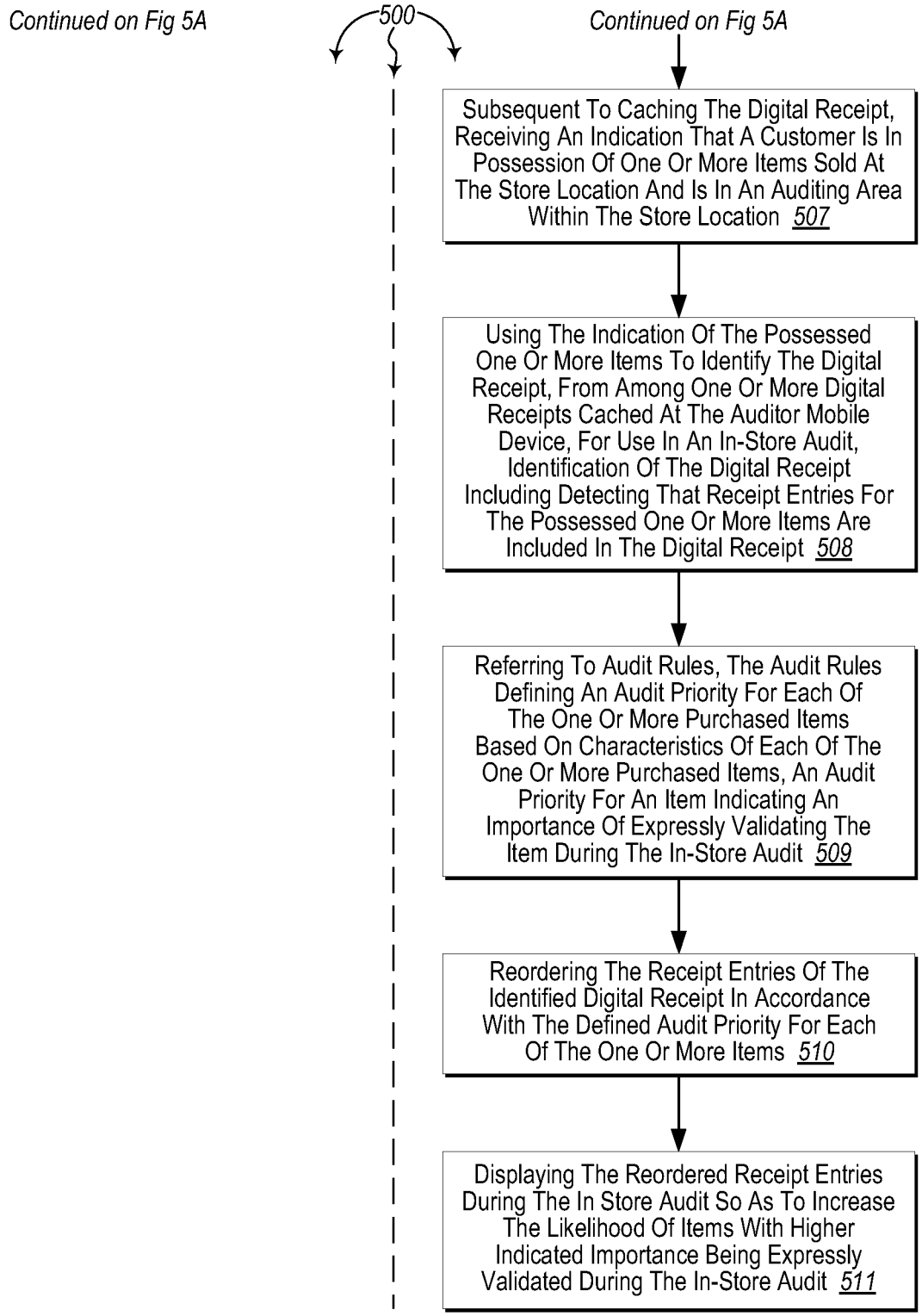

FIGS. 5A and 5B illustrate a flow chart of an example method 500 for locating and reordering digital receipt data for use in an in-store audit. Method 500 will be described with respect to the components and data of computer architecture 400.

Method 500 includes receiving digital receipt data for a sales transaction conducted at a Point-Of-Sale (POS) system, the Point-Of-Sale (POS) system in a store location selected from among the one or more store locations, the digital receipt data containing a receipt entry for each of one or more items purchased by a customer in the sales transaction (501). For example, receipt application server 421 can receive digital receipt data 431 for a sales transaction conducted at POS system 402A. Digital receipt data 431 contains entries 433A, 433B, 434C, etc. for items 434A, 434B, 434C, etc. purchased in the sales transaction by a customer at location 401.

Method 500 includes generating a digital receipt for the sales transaction, the digital receipt generated from the digital receipt data, the digital receipt containing the receipt entry for each of the one or more purchased items, the digital receipt providing proof of the sales transaction, the digital receipt for delivery to a customer mobile device associated with the customer (502). For example, receipt application server 421 can generate digital receipt 432 from digital receipt data 431. Digital receipt 432 provides proof of the sales transaction at POS system 402A. Digital receipt 432 can be delivered to a customer mobile device associated with the customer.

Method 500 includes receiving an indication that the sales transaction is to be audited in the store location (503). For example, receipt application server 421 can receive an indication that the sales transactions corresponding to digital receipt 432 is to be audited. In some embodiments, receipt application server 421 is configured to audit all sales transactions. In other embodiments, receipt application server 421 refers to audit settings 424 to determine if a sales transaction is to be audited. Audit settings 424 can indicate that digital receipts with entries for specified items (e.g., higher profit margin items, bulkier items, items that are more likely to be stolen, etc.) are to audited, can indicate that digital receipts are to be randomly audited, can indicate that digital receipts are to be audited at specified dates and/or times, can indicate that digital receipts are to be audited based on the number of entries in a digital receipt, etc.

Method 500 includes sending the digital receipt to an auditor mobile device at the store location, the auditor mobile device used to reorder receipt entries in accordance with audit rules, the audit rules defining an audit priority for each of the one or more purchased items based on characteristics of each of the one or more purchased items, an audit priority for an item indicating an importance of expressly validating the item during the in-store audit, the reordered entries displayable during in-store audits to increase the likelihood of expressly validating items with higher indicated importance during the in-store audit (504). For example, receipt application server 421 can send digital receipt 432 to auditor mobile device 403. Prior to or after sending digital receipt 432, receipt application server 421 can also send digital receipt 442 (as well as other digital receipts for sales transactions conducted at location 401) to auditor mobile device 403.

Method 500 includes receiving a digital receipt from the receipt application server, the digital receipt corresponding to the sales transaction conducted at the store location, the digital receipt containing a receipt entry for each of one or more items purchased by a customer in the sales transaction (505). For example, auditor mobile device 403 can receive digital receipt 432 from receipt application server 421. Prior to or after receiving digital receipt 432, auditor mobile device 403 can also receive digital receipt 442 (as well as other digital receipts for sales transactions conducted at location 401) from receipt application server 421.

Method 500 includes caching the digital receipt at the auditor mobile device (506). For example, auditor mobile device 403 can cache digital receipt 432 in cache 407. Prior to or after caching digital receipt 432, auditor mobile device 403 can also cache digital receipt 442 (as well as other digital receipts for sales transactions conducted at location 401) in cache 407.

Method 500 includes subsequent to caching the digital receipt, receiving an indication that a customer is in possession of one or more items sold at the store location and is in an auditing area within the store location (507). For example, receipt locator module 404 can receive indication 471 and/or indication 472 indicating that a customer is in possession of item 444B and/or item 444C. Indications 471 and 472 can be received from a peripheral device, such as, for example, a barcode scanner or keyboard, connected to auditor mobile device 403. For example, a human auditor can scan a barcode on an item in a customer's possession (e.g., in a shopping cart).

Auditor mobile device 403 can be stationed at a specified audit area within location 401 (e.g., somewhere in a path between checkout lanes and a store exit). Thus, when an item is indicated to auditor mobile device 403, auditor mobile device 403 views the customer possessing the item to be within the specified audit area.

Method 500 includes using the indication of the possessed one or more items to identify the digital receipt, from among one or more digital receipts cached at the auditor mobile device, for use in an in-store audit, identification of the digital receipt including detecting that receipt entries for the possessed one or more items are included in the digital receipt (508). For example, receipt locator module 404 can use indication 471 and/or indication 472 to identify digital receipt 432, from among digital receipts cached in cache 407, for use in an in-store audit at location 401. To identify digital receipt 432, receipt locator module 404 can detect that digital receipt 432 includes entry 433B for item 434B and/or can detect that digital receipt 432 includes entry 433C for item 434C.

That is, one or more items identified in a customer's possession (by indications 471 and 472) are listed in a cached digital receipt (digital receipt 432). As such, auditor mobile device 403 has some level of certainty that the cached digital receipt (digital receipt 432) corresponds to the customer's sales transaction and that the cached digital receipt (digital receipt 432) lists other purchased items that are to be in the customer's possession.

Method 500 includes referring to audit rules, the audit rules defining an audit priority for each of the one or more purchased items based on characteristics of each of the one or more purchased items, an audit priority for an item indicating an importance of expressly validating the item during the in-store audit (509). For example, reordering module 408 can refer to audit rules 426. Audit rules 426 represent a merchant or retailer defined audit priority for each of items 434A, 434B, 434C, etc. based on characteristics of each of items 434A, 434B, 434C, etc. For example, audit rules 426 can indicate that the merchant or retailer has placed increased importance on expressly validating items with specified characteristics, such as, for example, higher profit margins items, bulkier items, items that are more likely to be stolen, etc. during an in-store audit.

Method 500 includes reordering the receipt entries of the identified digital receipt in accordance with the defined audit priority for each of the one or more items (510). For example, reordering module 408 can reorder entries 433A, 433B, 433C, etc. of digital receipt 432 in accordance with the defined audit priority for each of items 434A, 434B, 434C, etc. Items 434A, 434B, 434C, etc. can be reordered to increase the likelihood of items with higher indicated importance being expressly validated during the in-store audit. Reordering receipt entries can include changing the original ordering of entries in a digital receipt. An original (or default) ordering can be the order in which items where scanned at the time of the sales transactions (e.g., the sales transaction for which digital receipt 432 was generated).

For example, it may be that a merchant or retailer has defined audit rules 426 to indicate that items are to be ordered by highest profit margin. If item 434C is the highest profit margin item on digital receipt 432, reordering module 408 can order entry 433C for display with increased prominence. If item 434A is the second highest profit margin item on digital receipt 432, reordering module 408 can order entry 433A for display with increased prominence but somewhat less prominence than entry 433C. Reordering module 408 can order other entries on digital receipt 432 for display prominence concomitant with corresponding item profit margins. For example, reordering module 408 can order entry 433B for somewhat lower display prominence relative to entries 433C and 433A but with higher display prominence than some other receipt entries.

In other embodiments, reordering module 408 can reorder digital receipt entries by item bulkiness, likelihood of items being stolen, etc. Reordering module 408 can refer to an item database (e.g., the item database used by POS systems at location 401) to access item characteristics for items listed on a digital receipt.

Method 500 includes displaying the reordered receipt entries during the in-store audit so as to increase the likelihood of items with higher indicated importance being expressly validated during the in-store audit (511). For example, auditor mobile device 403 can display reordered entries from digital receipt 432 at display 406. The reordered entries can be displayed in a list format with the first ordered entry at the top and followed by other entries in descending order. For example, entry 433C can be displayed at the top of the list at display 406. Entry 433A can be displayed directly below entry 433C on the list at display 406. Entry 433B can be displayed one or more entries below entry 433A on the list at display 406. One or more other entries can be displayed below entry 433B on the list at display 406.

Reordered entries from digital receipt can be displayed at display 406 during an in-store audit of the customer in possession of item 434B and/or item 434C. A human auditor can refer to display 406 during the in-store audit of the customer. The human auditor can check if the customer is in possession of any items not listed in digital receipt 432 (e.g., the customer is attempting to steal an item). The human auditor can also check if the customer lacks possession of any items listed in digital receipt 432 (e.g., the customer left an item at a checkout lane). Since receipt entries for higher importance items are displayed nearer to the top of display 406, there is increased likelihood that the human auditor expressly validates these higher importance items since they can be more efficiently viewed.

In other embodiments, the prominence of displayed digital receipt entries can be increased or decreased by varying font size, varying font color, varying location on display 406, etc.

During an audit or when an audit is complete, the human auditor can indicate that they are satisfied with the outcome of the audit. For example, the human auditor can indicate that one or more items in a customer's possession where audited and found to be listed on the customer's receipt. When a human auditor is satisfied with the outcome of an audit, the human auditor can indicate to auditor mobile device 403 that a transaction was satisfactorily audited.

On the other hand, during an audit or when an audit is complete, the human auditor can indicate that they are not satisfied with audit. For example, the human auditor may find one or more items in a customer's possession that are not listed on the customer's receipt. When a human auditor is not satisfied with an audit, the human auditor can indicate to auditor mobile device 403 that there is a problem with the auditor. Alternately, the human auditor can call other employees to assist. An unsatisfactory audit can be escalated to more senior staff for performance of other measures, such as, for example, reviewing security footage.

Figure 6A:
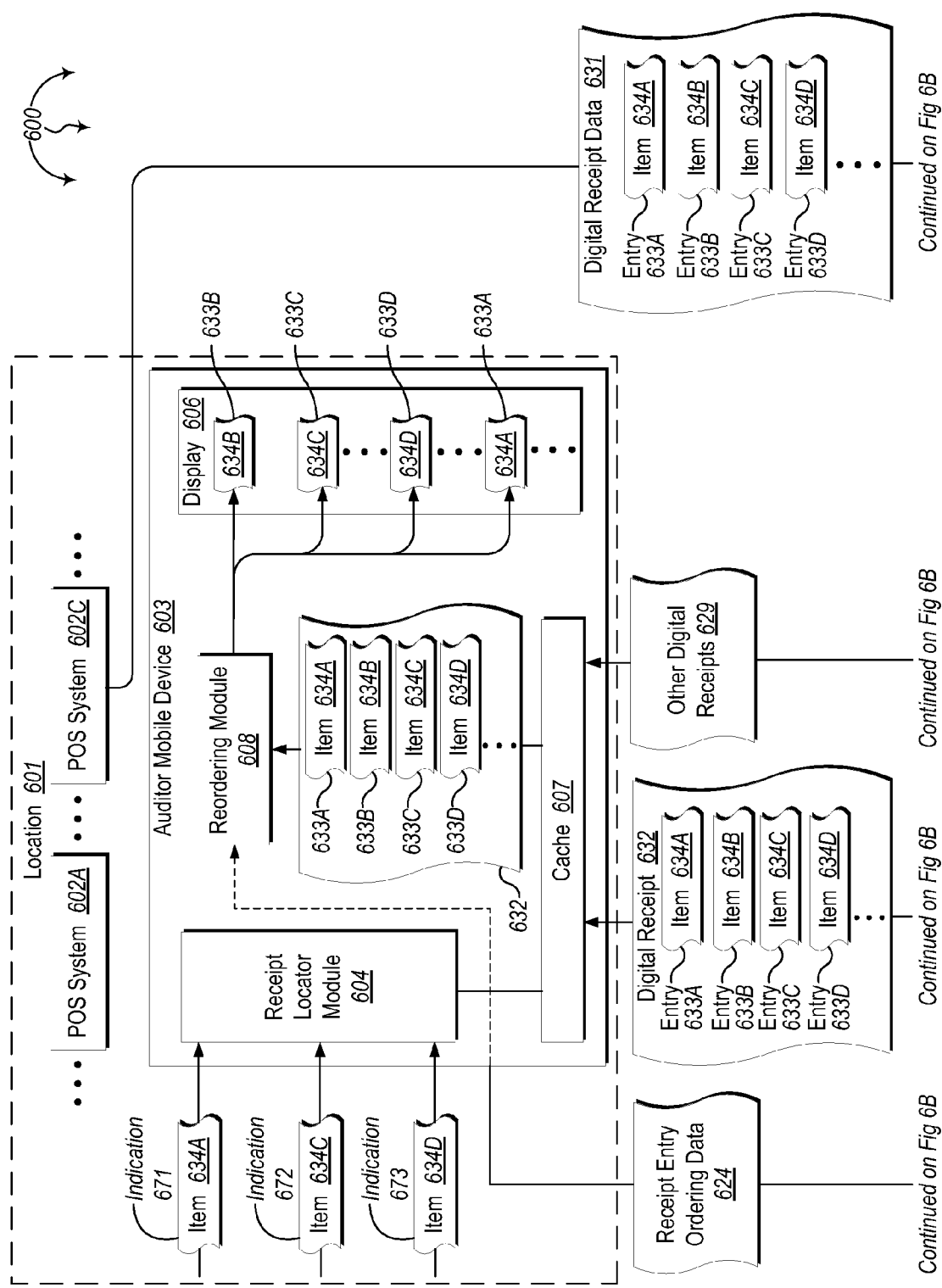
FIGS. 6A and 6B illustrate an example computer architecture that facilitates locating and reordering digital receipt data for use in an in-store audit.
Figure 6B:
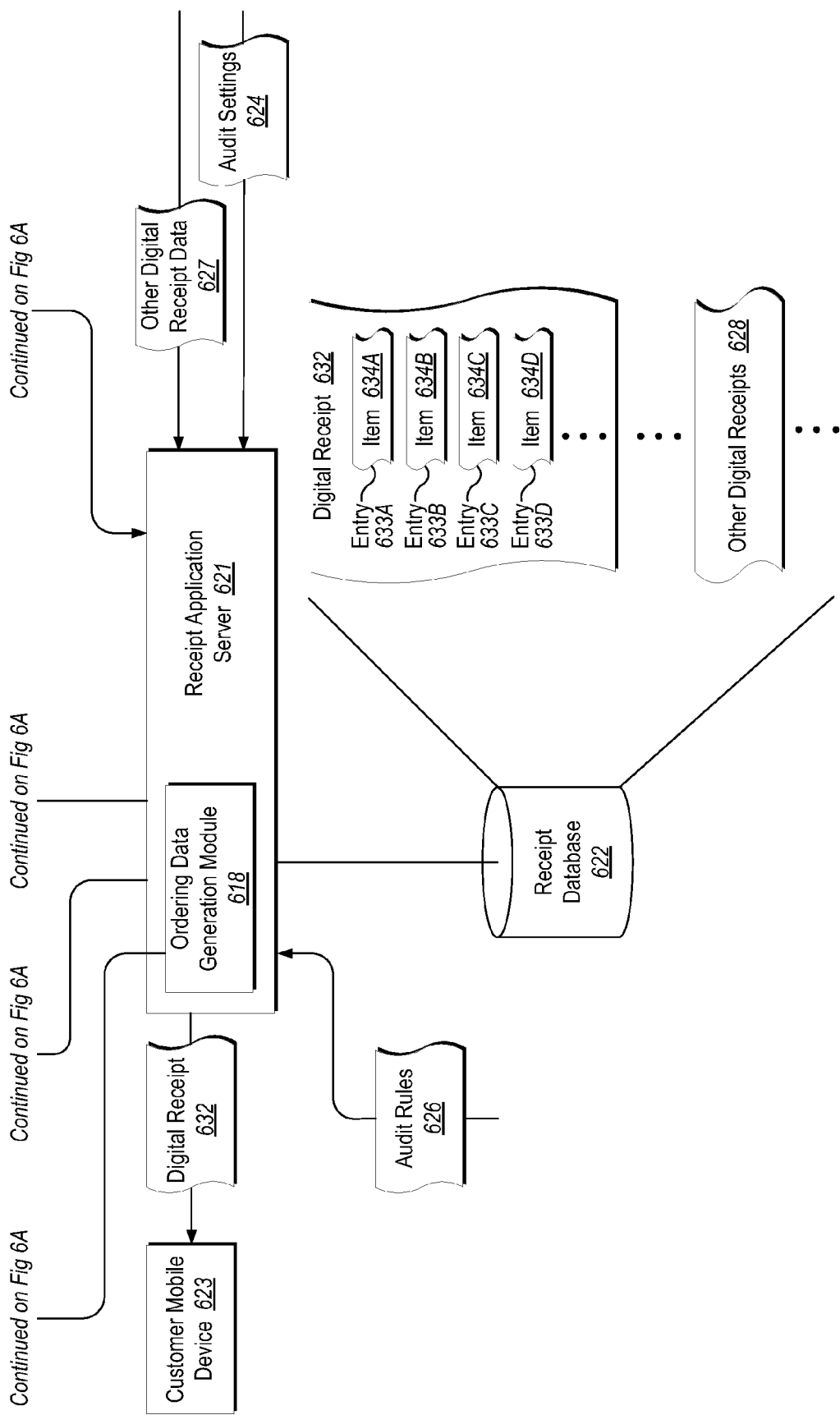

FIGS. 6A and 6B illustrates an example computer architecture 600 that facilitates locating and reordering digital receipt data for use in an in-store audit. Referring to FIGS. 6A and 6B, computer architecture 600 includes POS systems 602A-602C, auditor mobile device 603, receipt application server 621, and customer mobile device 623. Each of the depicted systems, servers, and devices as well as their respective components can be connected to one another over (or be part of) a network, such as, for example, a PAN, a LAN, a WAN, and even the Internet. Accordingly, each of the depicted components as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

POS systems 602A-602C, auditor mobile device 603, and receipt application server 621 can be commonly owned by a merchant or retailer that operates a chain of stores. Location 601 can be a physical store location for the merchant or retailer. The merchant or retailer can also have one or more other physical store locations (not depicted in FIG. 6). Location 601 and any other locations can be geographically diverse locations, such as, for example, in different cities, states, or countries. The ellipses before, between, and after POS systems 602A-602C represent that one or more additional POS systems can be included at location 601.

Each POS system, including POS systems 602A-602C can be physically located at a checkout lane. Each POS system, including POS systems 602A-602C can include a transaction processor, communication modules and adapters, and I/O peripherals.

Generally, a transaction processor is configured to manage sales transactions for a POS system. The transaction processor can receive input from I/O peripherals to open a sales transaction, collect digital receipt data (e.g., date, time, item, and cost data, etc.) for the sales transaction, and close the sales transaction. An item database can store item data for items sold by a retailer or merchant. For example, an item database can store item description data, item cost data, item size (bulkiness) data, item profit margin data, item theft statistics (how likely is the item to be stolen), etc. for a plurality of items. Digital receipt data for an item (e.g., item description and item cost) can be retrieved from the item database in response to scanning a barcode on (or otherwise identifying) the item. Other item data can be used internally by the merchant or retailer but not necessarily for the generation of digital receipts.

I/O peripherals can include one or more of: a monitor (e.g., a cashier-facing monitor), one or more input devices (e.g., scanners, keyboards, scales, or the like), one or more payment devices (e.g., cash drawers, card readers, etc.) for receiving or returning payments, and one or more output devices (e.g., customer-facing display or monitor, receipt printer, etc.).

Communication modules and adapters can include wired and/or wireless networking components for connecting the POS system with a network, such as, for example, a Wi-Fi and/or wired Ethernet network, that facilitates further connections (e.g., to the Internet).

Accordingly, when a sales transaction is closed, a POS system in a particular location can use communication modules and adapters to send digital receipt data to receipt application server 621. For example, POS systems in location 601 can send digital receipt data to receipt application server 621. More particularly, POS system 602C can send receipt data 631, including entries 633A, 633B, 633C, 633D, etc. for items 634A, 634B, 6334C, 634D, etc. respectively, to receipt application server 621. Likewise, other POS systems at location 601 (e.g., POS system 602A) can send receipt data to receipt application server 621.

Receipt database 622 can receive digital receipt data from POS systems at various different store locations, including location 601. Receipt database 622 can formulate digital receipts from received receipt data. Formulated digital receipts can include entries for items included in corresponding digital receipt data (but potentially in a different format, for example, a format deliverable to mobile devices). Receipt database 622 can store formulated digital receipts in receipt database 622. For example, receipt application server 621 can formulate and store digital receipts 632 from digital receipt data 631. Receipt application server 621 can also formulate other digital receipts 628 for other receipt data 627 (e.g., digital receipt data from other store locations). Receipt application server 621 can store digital receipts 632 and other receipts 628 in receipt database 622.

As such, in some embodiments, receipt data server 621 is part of a backend system that receives receipt data from a plurality of POS systems distributed throughout different geographic locations. The plurality of POS systems and the backend system can be part of a commonly owned and/or controlled corporate network infrastructure.

Subsequent to storing digital receipts, receipt application server 621 can send stored digital receipts to customer and/or auditor mobile devices, such as, for example, smartphones and/or tablets. Receipt application server 621 can send digital receipts to a mobile device in response to a request and/or in accordance with configured settings. For example, in response to a request for receipts from customer mobile device 623, receipt application server 621 can send digital receipt 632 to customer mobile device 623. Alternately or in combination, receipt application server 621 can send digital receipts 632 and other digital receipts 629 (e.g., a subset of other digital receipts 628) to zero or more auditor devices, such as, for example, auditor mobile device 603, in accordance with audit settings 624. Sending digital receipts from receipt application server 621 to zero or more auditor devices can involve push or polled mechanisms. Receipt application server 621 can send digital receipts in a web or native view. Audit settings 624 can indicate how and when to delivery digital receipts to a merchant's or retailer's store locations for use in conducting customer audits (e.g., auditing a customer's possessed merchandise as they leave a physical store location).

In some embodiments, POS systems attach a location identifier to digital receipt data sent to receipt application server 621. Audit settings 624 can include mappings between auditor mobile devices and location identifiers. Receipt application server 621 can use the mappings to delivery digital receipts back to an auditor mobile device at the same location where a sales transaction occurred.

For example, POS system 602C can attach a location identifier for location 601 to digital receipt data 631. Audit settings 624 can include a mapping between the location identifier and auditor mobile device 603 (an auditor mobile device for location 601). Receipt application server 621 can use the mapping to send corresponding digital receipts (e.g., digital receipt 632) back to auditor mobile device 603. Audit settings 624 can also include mappings between location identifiers and auditor mobile devices in other locations (e.g., store locations that sent other digital receipt data 627). Receipt application server 621 can use the mappings to send corresponding digital receipts back to other auditor mobile devices.

Receipt application server 621 also includes ordering data generation module 618. Ordering data generation module 618 is configured to generate receipt entry ordering data. Receipt entry ordering data instructs an auditor mobile device how to order receipt entries for presentation at a display. Ordering data generation module 618 can refer to audit rules to determine how receipt entries are to be ordered for presentation at the display device. For example, ordering data generation module 618 can refer to audit rules 626 to determine how receipts entries are to be ordered for presentation at display 606. Audit rules can indicate how to reorder entries of a digital receipt for display based on item characteristics. For example, audit rules can indicate that items with higher profit margins, larger (or bulkier) items, items that are more likely to be stolen, etc. are to be presented more prominently at a display.

In some embodiments, generated receipt entry ordering data includes instructions expressly instructing an auditor mobile device how to order receipt entries. For example, ordering data generation module 618 can process audit rules 626 to generate a set of instructions that can be executed by a reordering module at an auditor mobile device. In these embodiments, reordering modules can include less advanced decision making and processing capabilities.

In other embodiments, receipt entry ordering data includes an applicable subset of audit rules 626. For example, ordering data generation module 618 can extract an applicable portion of audit rules 626 for processing by reordering module at an auditor mobile device. Receipt entry ordering data can be sent along with or separately from a digital receipt. In these other embodiments, reordering modules can include more advanced decision making and processing capabilities.

Receipt entry ordering data can be generated and sent to an auditor mobile device on a per digital receipt basis. Alternately, receipt entry ordering data can be generated and sent to an auditor mobile device less frequently.

As depicted, auditor mobile device 603 further includes receipt locator module 604, display 606, cache 607, and reordering module 608. In general, an auditor mobile device can receive digital receipts and receipt entry ordering data from receipt application server 621. The auditor mobile device can cache received digital receipts (possibly along with corresponding receipt entry ordering data) locally for use in conducting customer audits. For example, auditor mobile device 603 can cache digital receipts and corresponding receipt entry ordering data received from receipt application server 621 in cache 607 (e.g., system memory, a flash drive, or other storage).

When receipt entry ordering data is generated and sent per digital receipt, an auditor mobile device can cache a digital receipt and corresponding receipt entry ordering data in accordance with a caching policy for a specified time period before the digital receipt and receipt entry ordering data are removed. The caching policy can be configured so that there is a high likelihood of a digital receipt and corresponding receipt entry ordering data for a sales transaction still being cached when a customer that participated in the sales transaction reaches a location where an audit is to occur. The caching policy can also be configured so that a portion of cache remains available for new digital receipts and receipt entry ordering data. In some embodiments, the specified time period is in a range from 5-30 minutes.

When receipt entry ordering data is generated and sent less frequently (and is thus applicable to a plurality of different digital receipts), the receipt entry ordering data may or may not be cached at cache 607. For example, in some embodiments, receipt entry ordering data bypasses cache 607 and is maintained at reordering module 608.

A receipt locator module at an auditor mobile device can locate digital receipts and, when appropriate, corresponding receipt entry ordering data, from within cache based on one or more identified items. For example, a human auditor can scan a barcode or key in information for one more items in a customer's possession. The receipt locator module can search the cache to locate a digital receipt that includes (matches) an entry for each of the one or more items. Matching one or more identified items to one or more entries of a digital receipt provides some degree of certainty that a located digital receipt (and receipt entry ordering data) corresponds to the customer. For example, receipt locator module 604 can search cache 607 to locate digital receipts that include (and receipt entry ordering data for) entries for items identified at auditor mobile device 603.

A reordering module can refer to receipt entry ordering data to determine how matched as well as additional entries from located digital receipts are to be ordered for presentation at a display device. For example, reordering module 608 can refer to receipt entry ordering data 624 to determine how entries from located receipts are to be ordered for presentation at display 606. Receipt entry ordering data can indicate how to reorder entries of a digital receipt for display based on items characteristics. For example, receipt entry ordering data can indicate that items with higher profit margins, larger (or bulkier) items, items that are more likely to be stolen, etc. are to be presented more prominently at a display.

When receipt entry ordering data includes express instructions, a reordering module can execute the instructions to reorder receipt entries. On the other hand, when receipt entry ordering data includes a subset of audit rules 626, a reordering module can process the audit rules to determine how to reorder receipt entries.

Reordered entries from a located digital receipt can then be presented at a display device for use in conducting an in-store audit. A human auditor can refer to the presented entries to audit (e.g., matched and/or additional) items in the customer's possession. For example, reordered entries from digital receipts located in cache 607 can be presented at display 606. A human auditor at location 601 can refer to the entries presented at display 606 to perform an in-store audit of a customer. During display of digital receipt entries at display 606, some parts of a digital receipt can be hidden from the human auditor's view to ensure customer privacy.

The human auditor may also chose to apply different audit priorities after viewing reordered receipt entries. For example, if receipt entries where initially ordered by bulk the human auditor may choose to reorder based on profit margin or likelihood of theft.

Prior to use of auditor mobile device 603 by a human auditor, the human auditor can authenticate on auditor mobile device 603. The human auditor can then select a store location, for example, based on geolocation.

Figure 7B:
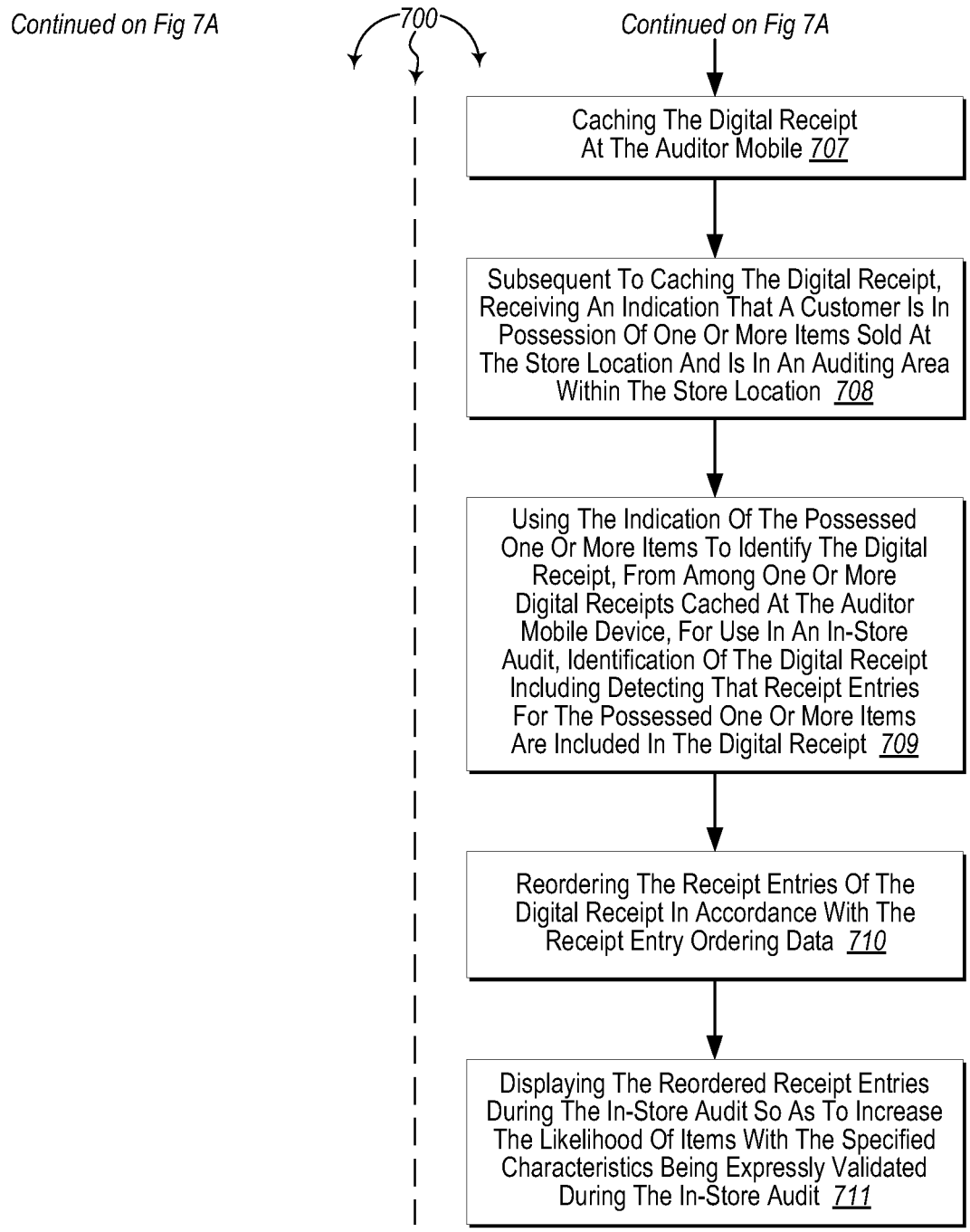

FIGS. 7A and 7B illustrates a flow chart of an example method 700 for locating and reordering digital receipt data for use in an in-store audit. Method 700 will be described with respect to the components and data of computer architecture 600.

Method 700 includes receiving digital receipt data for a sales transaction conducted at a Point-Of-Sale (POS) system, the Point-Of-Sale (POS) system in a store location selected from among the one or more store locations, the digital receipt data containing a receipt entry for each of one or more items purchased by a customer in the sales transaction (701). For example, receipt application server 621 can receive digital receipt data 631 for a sales transaction conducted at POS system 602C. Digital receipt data 631 contains entries 633A, 633B, 633C, 633D, etc. for items 634A, 634B, 634C, 634D, etc. purchased in the sales transaction by a customer at location 601.

Method 700 includes generating a digital receipt for the sales transaction, the digital receipt generated from the digital receipt data, the digital receipt containing the receipt entry for each of the one or more purchased items, the digital receipt providing proof of the sales transaction, the digital receipt for delivery to a customer mobile device associated with the customer (702). For example, receipt application server 621 can generate digital receipt 632 from digital receipt data 631. Digital receipt 632 provides proof of the sales transaction at POS system 602C. Digital receipt 632 can be delivered to a customer mobile device associated with the customer.

Method includes receiving an indication that the sales transaction is to be audited in the store location (703). For example, receipt application server 621 can receive an indication that the sales transactions corresponding to digital receipt 632 is to be audited. In some embodiments, receipt application server 621 is configured to audit all sales transactions. In other embodiments, receipt application server 621 refers to audit settings 624 to determine if a sales transaction is to be audited. Audit settings 624 can indicate that digital receipts with entries for specified items (e.g., higher profit margin items, bulkier items, items that are more likely to be stolen, etc.) are to be audited, can indicate that digital receipts are to be randomly audited, can indicate that digital receipts are to be audited at specified dates and/or times, can indicate that digital receipts are to be audited based on the number of entries in a digital receipt, etc.

Method 700 includes accessing receipt entry ordering data, the receipt entry ordering data specifying how receipt entries are to be ordered to increase the likelihood of items with specified characteristics being expressly validated during an in-store audit (704). For example, ordering data generation module 618 can generate receipt entry ordering data 624. Receipt entry ordering data 624 specifies how receipt entries are to be ordered to increase the likelihood of items with specified characteristics being expressly validated during an in-store audit at location 601. Receipt entry ordering data 624 can include a subset of audit rules 626 or can include express instructions generated from definitions included in audit rules 626.

Audit rules 626 represent merchant or retailer defined audit priorities for items based on the characteristics of the items. For example, audit rules 626 can indicate that the merchant or retailer has placed increased importance on expressly validating items with specified characteristics, such as, for example, higher profit margins items, bulkier items, items that are more likely to be stolen, etc. during an in-store audit.

Method 700 includes sending the digital receipt and receipt entry ordering data to an auditor mobile device at the store location, the auditor mobile device used for in-store audits at the store location, the receipt entries displayable at the auditor mobile device in accordance with the receipt entry ordering data such that the likelihood of expressly validating items having the specified characteristics is increased during the in-store audit of the sales transaction (705). For example, receipt application server 621 can send digital receipt 632 and receipt entry ordering data 624 to auditor mobile device 603. Receipt application server 621 can send digital receipt 632 along with or separate from receipt entry ordering data 624. Prior to or after sending digital receipt 632, receipt application server 621 can also send other digital receipts 629 (as well as other receipt entry ordering data as appropriate) to auditor mobile device 603.

Method 700 includes receiving a digital receipt and receipt entry ordering data from the receipt application server, the digital receipt corresponding to a sales transaction conducted at the store location, the digital receipt containing a receipt entry for each of one or more items purchased by a customer in the sales transaction, the receipt entry ordering data specifying how receipt entries are to be ordered to increase the likelihood of items with specified characteristics being expressly validated during an in-store audit (706). For example, auditor mobile device 603 can receive digital receipt 632 and receipt entry ordering data 624 from receipt application server 621. Auditor mobile device 603 can receive digital receipt 632 along with or separate from receipt entry ordering data 624. Prior to or after receiving digital receipt 632, auditor mobile device 603 can also receive other digital receipts 629 (as well as other receipt entry ordering data as appropriate) from receipt application server 621.

Method 700 includes caching the digital receipt at the auditor mobile device (707). For example, auditor mobile device 603 can cache digital receipt 632 in cache 607. Prior to or after caching digital receipt 632, auditor mobile device 603 can also cache other digital receipts 629. In some embodiments, auditor mobile device 603 caches receipt entry ordering data 624 (as well as other receipt entry ordering data received from receipt application server 621). In other embodiments, auditor mobile device 603 sends receipt entry ordering data 624 (as well as other receipt entry ordering data received from receipt application server 621) to reordering module 608.

Method 700 includes subsequent to caching the digital receipt, receiving an indication that a customer is in possession of one or more items sold at the store location and is in an auditing area within the store location (708). For example, receipt locator module 604 can receive one or more of indications 671, 672, and 673 indicating that a customer is in possession of items 634A, 634C, and 634D. Indications 671, 672, and 673 can be received from a peripheral device, such as, for example, a barcode scanner or keyboard, connected to auditor mobile device 603. For example, a human auditor can scan a barcode on an item in a customer's possession (e.g., in a shopping cart).

Auditor mobile device 603 can be stationed at a specified audit area within location 601 (e.g., somewhere in a path between checkout lanes and a store exit). Thus, when an item is indicated to auditor mobile device 603, auditor mobile device 603 views the customer possessing the item to be within the specified audit area.

Method 700 includes using the indication of the possessed one or more items to identify the digital receipt, from among one or more digital receipts cached at the auditor mobile device, for use in an in-store audit, identification of the digital receipt including detecting that receipt entries for the possessed one or more items are included in the digital receipt (709). For example, receipt locator module 604 can use one or more of: indications 671, 672, and 673 to identify digital receipt 632, from among digital receipts cached in cache 607, for use in an in-store audit at location 601. To identify digital receipt 632, receipt locator module 604 can detect that digital receipt 632 includes one or more of: entry 633A for item 634A, entry 633C for item 634C, and entry 633D for item 634D.

That is, one or more items identified in a customer's possession (by indications 671, 672, and 673) are listed in a cached digital receipt (digital receipt 632). As such, auditor mobile device 603 has some level of certainty that the cached digital receipt (digital receipt 632) corresponds to the customer's sales transaction and that the cached digital receipt (digital receipt 632) lists other purchased items that are to be in the customer's possession.

Method 700 includes reordering the receipt entries of the digital receipt in accordance with the receipt entry ordering data (710). For example, reordering module 608 can reorder entries 633A, 633B, 633C, 633D etc., of digital receipt 632 in accordance with receipt entry ordering data 624. Entries 633A, 633B, 633C, 633D, etc, can be reordered to increase the likelihood of items with higher indicated importance being expressly validated during the in-store audit. Reordering receipt entries can include changing the original ordering of entries in a digital receipt. An original (or default) ordering can be the order in which items where scanned at the time of the sales transactions (e.g., the sales transaction for which digital receipt 632 was generated).

When appropriate, reordering module 608 can access receipt entry ordering data 624 from cache 607.

In some embodiments, reordering module 608 executes express instructions included in receipt entry ordering data 624 to reorder receipt entries of digital receipt 632. In other embodiments, reordering module 608 refers to defined audit priorities (in a subset of audit rules 626) included in receipt entry ordering data 624 to reorder receipt entries of digital receipt 632.

Through either of express instructions or defined audit priorities (in a subset of audit rules 626) a merchant or retailer can indicate that items are to be ordered by bulkiness. If item 634B is the bulkiest item on digital receipt 632, reordering module 608 can reorder entry 633B for display with increased prominence. If item 634C is the second bulkiest item, reordering module 608 can reorder entry 633C for display with increased prominence but somewhat less prominence than entry 634B. If item 634D is less bulky than item 634C, reordering module 608 can reorder entry 633D for display with less prominence that entry 633C (and possibly with less prominence than one or more other receipts entries of digital receipt 632). If item 634A is less bulky than item 634D, reordering module 608 can reorder entry 633A for display with less prominence that entry 633D (and possibly with less prominence than one or more other receipts entries of digital receipt 632).

In other embodiments, reordering module 608 can reorder digital receipt entries by profit margin, likelihood of items being stolen, etc. Reordering module 608 can refer to an item database (e.g., the item database used by POS systems at location 601) to access item characteristics for items listed on a digital receipt.

Method 700 includes displaying the reordered receipt entries during the in-store audit so as to increase the likelihood of items with the specified characteristics being expressly validated during the in-store audit (711). For example, auditor mobile device 603 can display reordered entries from digital receipt 632 at display 606. The reordered entries can be displayed in a list format with the first ordered entry at the top and followed by other entries in descending order. For example, entry 633B can be displayed at the top of the list at display 606. Entry 633C can be displayed directly below entry 633B on the list at display 406. Entry 633D can be displayed one or more entries below entry 633C on the list at display 406. Entry 633A can be display one or more entries below entry 633D. One or more other entries can be displayed below entry 633A on the list at display 606.

Reordered entries from digital receipt can be displayed at display 606 during an in-store audit of the customer in possession of one or more of items: 634A, 634C, and 634D. A human auditor can refer to display 606 during the in-store audit of the customer. The human auditor can check if the customer is in possession of any items not listed in digital receipt 632 (e.g., the customer is attempting to steal an item). The human auditor can also check if the customer lacks possession of any items listed in digital receipt 632 (e.g., the customer left an item at a checkout lane). Since receipt entries for higher importance items are displayed nearer to the top of display 606, there is increased likelihood that the human auditor expressly validates these higher importance items.

In other embodiments, the prominence of displayed digital receipt entries can be increased or decreased by varying font size, varying font color, varying location on display 606, etc.

During an audit or when an audit is complete, the human auditor can indicate that they are satisfied with the outcome of the audit. For example, the human auditor can indicate that one or more items in a customer's possession where audited and found to be listed on the customer's receipt. When a human auditor is satisfied with the outcome of an audit, the human auditor can indicate to auditor mobile device 603 that a transaction was satisfactorily audited.

On the other hand, during an audit or when an audit is complete, the human auditor can indicate that they are not satisfied with audit. For example, the human auditor may find one or more items in a customer's possession that are not listed on the customer's receipt. When a human auditor is not satisfied with an audit, the human auditor can indicate to auditor mobile device 603 that there is a problem with the auditor. Alternately, the human auditor can call other employees to assist. For example, an unsatisfactory audit can be escalated to more senior staff for performance of other measures, such as, for example, reviewing security footage.

Figure 8A:
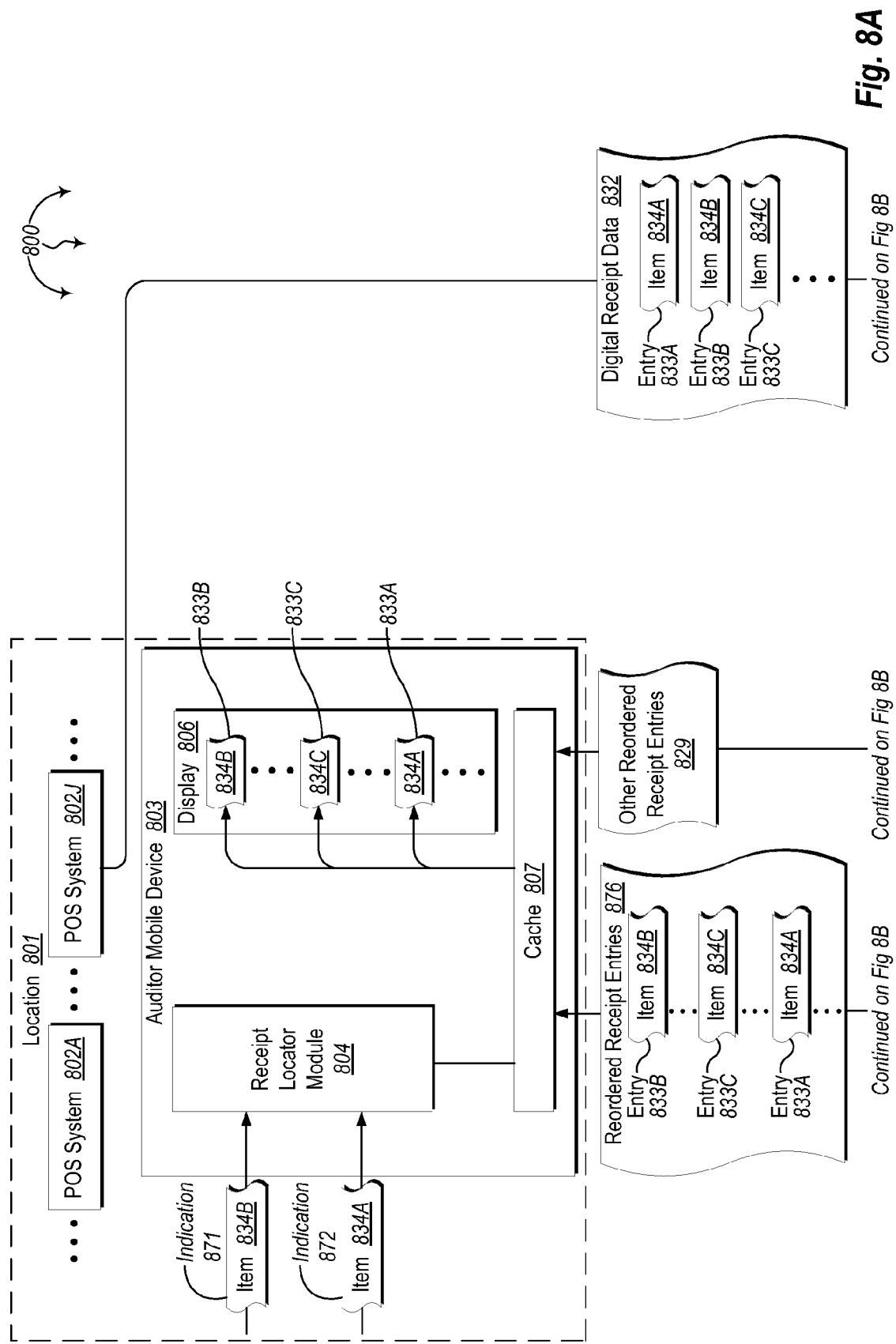

FIGS. 8A and 8B illustrates an example computer architecture 800 that facilitates reordering and locating digital receipt data for use in an in-store audit. Referring to FIGS. 8A and 8B, computer architecture 800 includes POS systems 802A-802J, auditor mobile device 803, receipt application server 821, and customer mobile device 823. Each of the depicted systems, servers, and devices as well as their respective components can be connected to one another over (or be part of) a network, such as, for example, a PAN, a LAN, a WAN, and even the Internet. Accordingly, each of the depicted components as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

POS systems 802A-802J, auditor mobile device 803, and receipt application server 821 can be commonly owned by a merchant or retailer that operates a chain of stores. Location 801 can be a physical store location for the merchant or retailer. The merchant or retailer can also have one or more other physical store locations (not depicted in FIG. 8). Location 801 and any other locations can be geographically diverse locations, such as, for example, in different cities, states, or countries. The ellipses before, between, and after POS systems 802A-802J represent that one or more additional POS systems can be included at location 801.

Each POS system, including POS systems 802A-802J can be physically located at a checkout lane. Each POS system, including POS systems 802A-802J can include a transaction processor, communication modules and adapters, and I/O peripherals.

Generally, a transaction processor is configured to manage sales transactions for a POS system. The transaction processor can receive input from I/O peripherals to open a sales transaction, collect digital receipt data (e.g., date, time, item, and cost data, etc.) for the sales transaction, and close the sales transaction. An item database can store item data for items sold by a retailer or merchant. For example, an item database can store item description data, item cost data, item size (bulkiness) data, item profit margin data, item theft statistics (how likely is the item to be stolen), etc. for a plurality of items. Digital receipt data for an item (e.g., item description and item cost) can be retrieved from the item database in response to scanning a barcode on (or otherwise identifying) the item. Other item data can be used internally by the merchant or retailer but not necessarily for the generation of digital receipts.

I/O peripherals can include one or more of: a monitor (e.g., a cashier-facing monitor), one or more input devices (e.g., scanners, keyboards, scales, or the like), one or more payment devices (e.g., cash drawers, card readers, etc.) for receiving or returning payments, and one or more output devices (e.g., customer-facing display or monitor, receipt printer, etc.).

Communication modules and adapters can include wired and/or wireless networking components for connecting the POS system with a network, such as, for example, a Wi-Fi and/or wired Ethernet network, that facilitates further connections (e.g., to the Internet).

Accordingly, when a sales transaction is closed, a POS system in a particular location can use communication modules and adapters to send digital receipt data to receipt application server 821. For example, POS systems in location 801 can send digital receipt data to receipt application server 821. More particularly, POS system 802J can send receipt data 831, including entries 833A, 833B, 833C, etc. for items 834A, 834B, 834C, etc. respectively, to receipt application server 821. Likewise, other POS systems at location 801 (e.g., POS system 802A) can send receipt data to receipt application server 821.

Receipt database 822 can receive digital receipt data from POS systems at various different store locations, including location 801. Receipt database 822 can formulate digital receipts from received receipt data. Formulated digital receipts can include entries for items included in corresponding digital receipt data (but potentially in a different format, for example, a format deliverable to mobile devices). Receipt database 822 can store formulated digital receipts in receipt database 822. For example, receipt application server 821 can formulate and store digital receipts 832 from digital receipt data 831. Receipt application server 821 can also formulate other digital receipts 828 for other receipt data 827 (e.g., digital receipt data from other store locations). Receipt application server 821 can store digital receipts 832 and other receipts 828 in receipt database 822.

As such, in some embodiments, receipt data server 821 is part of a backend system that receives receipt data from a plurality of POS systems distributed throughout different geographic locations. The plurality of POS systems and the backend system can be part of a commonly owned and/or controlled corporate network infrastructure.

Subsequent to storing digital receipts, receipt application server 821 can send stored digital receipts to customer mobile devices, such as, for example, smartphones and/or tablets. Receipt application server 821 can send digital receipts to a mobile device in response to a request and/or in accordance with configured settings. For example, in response to a request for receipts from customer mobile device 823, receipt application server 821 can send digital receipt 832 to customer mobile device 823.

Alternately or in combination, receipt application server 821 can reorder receipt entries in a digital receipt in accordance with audit rules. Receipt application server 821 includes reordering module 808. Reordering module 808 is configured to reorder receipt entries of a digital receipt in accordance with auditing rules.

For example, reordering module 808 can refer to audit rules 826 to determine how entries from digital receipts in receipt database 822 (e.g., digital receipt 832 and other digital receipts 828) are to be reordered for presentation at an auditor mobile device. Audit rules can indicate how to reorder entries of a digital receipt for display based on items characteristics. For example, audit rules 826 can indicate that items with higher profit margins, larger (or bulkier) items, items that are more likely to be stolen, etc. are to be presented more prominently at a display. Reordered entries from digital receipts can then be sent to auditor mobile devices for display during in-store audits (e.g., auditing a customer's possessed merchandise as they leave a physical store location).

Receipt application server 821 can send reordered receipt entries to zero or more auditor devices, such as, for example, auditor mobile device 803, in accordance with audit settings 824. Sending reordered receipt entries from receipt application server 821 to zero or more auditor devices can involve push or polled mechanisms. Receipt application server 821 can send reordered receipt entries in a web or native view. Audit settings 824 can indicate how and when to delivery digital receipts to a merchant's or retailer's store locations for use in conducting customer audits. In some embodiments, POS systems attach a location identifier to digital receipt data sent to receipt application server 821. Audit settings 824 can include mappings between auditor mobile devices and location identifiers. Receipt application server 821 can use the mappings to delivery reordered receipt entries back to an auditor mobile device at the same location where a sales transaction occurred.

For example, POS system 802J can attach a location identifier for location 801 to digital receipt data 831. Audit settings 824 can include a mapping between the location identifier and auditor mobile device 803 (an auditor mobile device for location 801). Receipt application server 821 can use the mapping to send corresponding reordered receipt entries (e.g., reordered receipt entries 876) back to auditor mobile device 803. Audit settings 824 can also include mappings between location identifiers and auditor mobile devices in other locations (e.g., store locations that sent other digital receipt data 827). Receipt application server 821 can use the mappings to send corresponding reordered receipt entries back to other auditor mobile devices.

As depicted, auditor mobile device 803 further includes receipt locator module 804, display 806, and cache 607. In general, an auditor mobile device 803 can receive reordered receipt entries and cache reordered receipt entries for using conducting customer audits. For example, auditor mobile device 803 can cache reordered receipt entries received from receipt application server 821 in cache 807 (e.g., system memory, a flash drive, or other storage).

Auditor mobile device 803 can cache reordered receipt entries in accordance with a caching policy for a specified time period before the reordered receipt entries are removed. The caching policy can be configured so that there is a high likelihood of receipt entries for a sales transaction still being cached when a customer that participated in the sales transaction reaches a location where an audit is to occur. The caching policy can also be configured so that a portion of cache remains available for new reordered receipt entries. In some embodiments, the specified time period is in a range from 5-30 minutes.

A receipt locator module at an auditor mobile device can locate reordered receipt entries from within cache based on one or more identified items. For example, a human auditor can scan a barcode or key in information for one more items in a customer's possession. The receipt locator module can search the cache to locate a reordered receipt entries that includes (matches) an entry for each of the one or more items. Matching one or more identified items to one or more entries included in reordered receipt entries provides some degree of certainty that located receipt entries correspond to the customer. For example, receipt locator module 804 can search cache 807 to locate reordered receipt entries that include entries for items identified at auditor mobile device 803.

Located reordered receipt entries can then be presented at a display device for use in conducting an in-store audit. A human auditor can refer to the presented entries to audit (e.g., matched and/or additional) items in the customer's possession. For example, reordered receipt entries located in cache 807 can be presented at display 806. A human auditor at location 801 can refer to the entries presented at display 806 to perform an in-store audit of a customer. During display of digital receipt entries at display 806, some parts of a digital receipt can be hidden from the human auditor's view to ensure customer privacy.

The human auditor may also chose to apply different audit priorities after viewing reordered receipt entries. For example, if receipt entries where initially ordered by likelihood of theft, the human auditor may choose to reorder receipt entries based on profit margin or bulk.

Prior to use of auditor mobile device 803 by a human auditor, the human auditor can authenticate on auditor mobile device 803. The human auditor can then select a store location, for example, based on geolocation.

Figure 9A:
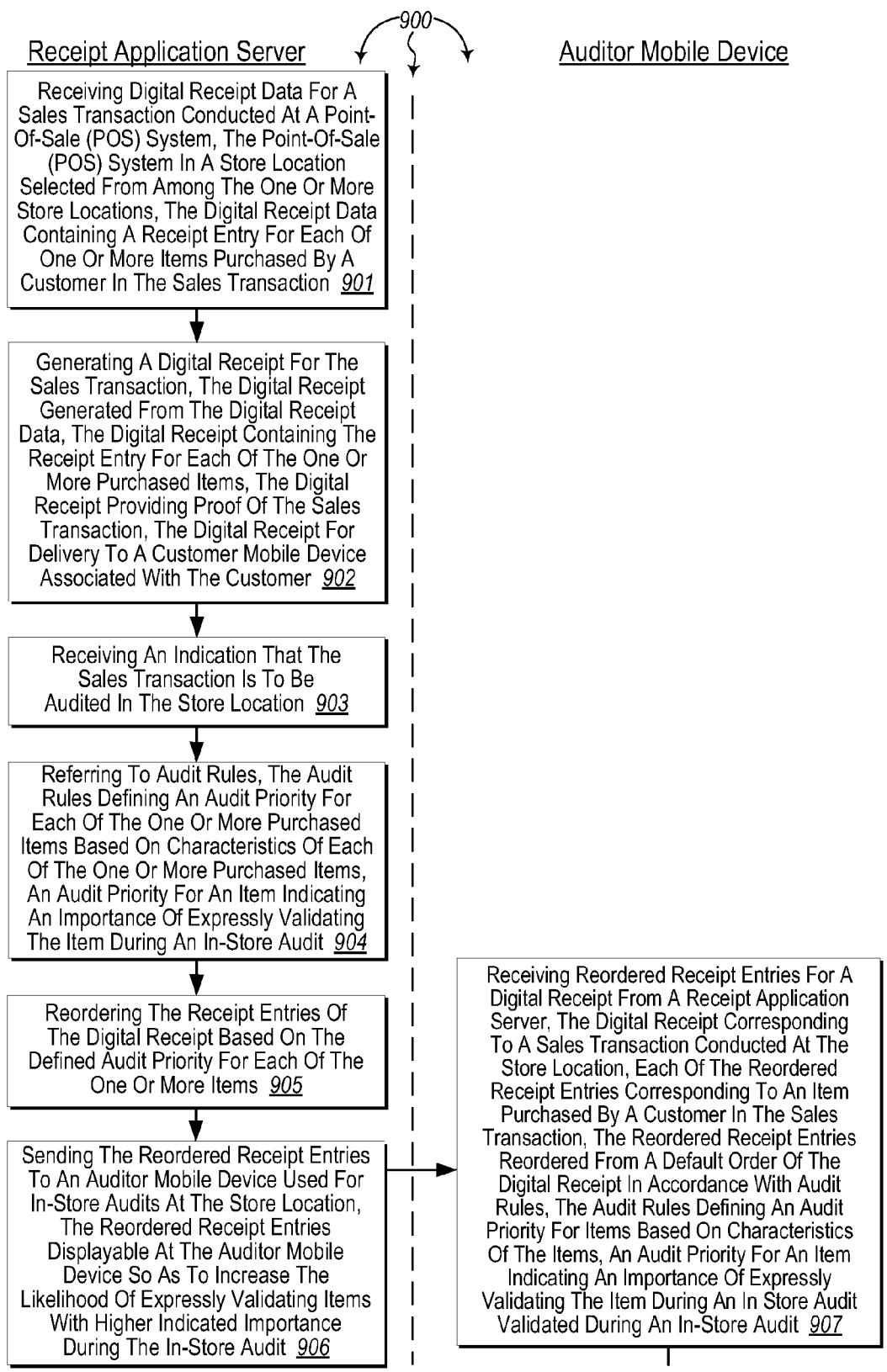
FIGS. 9A and 9B illustrate a flow chart of an example method for reordering and locating digital receipt data for use in an in-store audit.
Figure 9B:
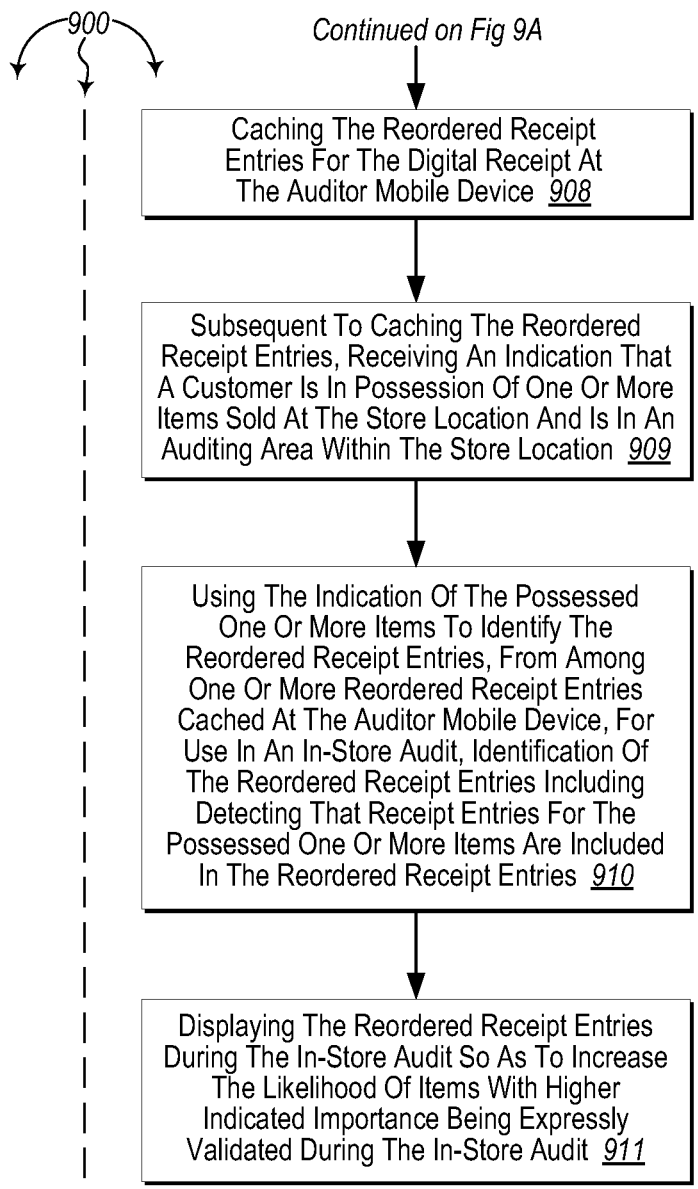

FIGS. 9A and 9B illustrates a flow chart of an example method for reordering and locating digital receipt data for use in an in-store audit. Method 900 will be described with respect to the components and data of computer architecture 800.

Method 900 includes receiving digital receipt data for a sales transaction conducted at a Point-Of-Sale (POS) system, the Point-Of-Sale (POS) system in a store location selected from among the one or more store locations, the digital receipt data containing a receipt entry for each of one or more items purchased by a customer in the sales transaction (901). For example, receipt application server 821 can receive digital receipt data 831 for a sales transaction conducted at POS system 802J. Digital receipt data 831 contains entries 833A, 834B, 834C, etc. for items 834A, 834B, 834C, etc. purchased in the sales transaction by a customer at location 801.

Method 900 includes generating a digital receipt for the sales transaction, the digital receipt generated from the digital receipt data, the digital receipt containing the receipt entry for each of the one or more purchased items, the digital receipt providing proof of the sales transaction, the digital receipt for delivery to a customer mobile device associated with the customer (902). For example, receipt application server 821 can generate digital receipt 832 from digital receipt data 831. Digital receipt 832 provides proof of the sales transaction at POS system 802J. Digital receipt 832 can be delivered to a customer mobile device associated with the customer.

Method 900 includes receiving an indication that the sales transaction is to be audited in the store location (903). For example, receipt application server 821 can receive an indication that the sales transactions corresponding to digital receipt 832 is to be audited. In some embodiments, receipt application server 821 is configured to audit all sales transactions. In other embodiments, receipt application server 821 refers to audit settings 824 to determine if a sales transaction is to be audited. Audit settings 824 can indicate that digital receipts with entries for specified items (e.g., higher profit margin items, bulkier items, items that are more likely to be stolen, etc.) are to audited, can indicate that digital receipts are to be randomly audited, can indicate that digital receipts are to be audited at specified dates and/or times, can indicate that digital receipts are to be audited based on the number of entries in a digital receipt, etc.

Method 900 includes referring to audit rules, the audit rules defining an audit priority for each of the one or more purchased items based on characteristics of each of the one or more purchased items, an audit priority for an item indicating an importance of expressly validating the item during the in-store audit (904). For example, reordering module 808 can refer to audit rules 826. Audit rules 826 represent a merchant or retailer defined audit priority for each of items 834A, 834B, 834C, etc. based on characteristics of each of items 834A, 834B, 834C, etc. For example, audit rules 826 can indicate that the merchant or retailer has placed increased importance on expressly validating items with specified characteristics, such as, for example, higher profit margins items, bulkier items, items that are more likely to be stolen, etc. during an in-store audit.

Method 900 includes reordering the receipt entries of the digital receipt based on the defined audit priority for each of the one or more items (905). For example, reordering module 808 can reorder entries 833A, 833B, 833C, etc. of digital receipt 832 into reordered receipt entries 876 in accordance with the defined audit priority for each of items 834A, 834B, 834C, etc. Items 834A, 834B, 834C, etc. can be reordered to increase the likelihood of items with higher indicated importance being expressly validated during the in-store audit. Reordering receipt entries can include changing the original ordering of entries in a digital receipt. An original (or default) ordering can be the order in which items where scanned at the time of the sales transactions (e.g., the sales transaction for which digital receipt 832 was generated).

For example, it may be that a merchant or retailer has defined audit rules 826 to indicate that items are to be ordered by likelihood of being stolen. If item 834B is the most likely item on digital receipt 832 to be stolen, reordering module 808 can order entry 833B for display with increased prominence. If item 834C is a moderately likely item on digital receipt 832 to be stolen, reordering module 808 can order entry 833C for display with an appropriate level prominence but with less prominence than entry 833B (and possibly with less prominence than one or more other entries). If item 834A is a less likely item on digital receipt 832 to be stolen, reordering module 808 can order entry 833A for display with an appropriate level prominence but with less prominence than entry 833C (and possibly with less prominence than one or more other entries). Reordering module 808 can order other entries on digital receipt 832 for display prominence concomitant with corresponding likelihoods of being stolen.

In other embodiments, reordering module 808 can reorder digital receipt entries by profit margin, item bulkiness, etc. Reordering module 808 can refer to an item database (e.g., the item database used by POS systems at location 801) to access item characteristics for items listed on a digital receipt.

Method 900 includes sending the reordered receipt entries to an auditor mobile device used for in-store audits at the store location, the reordered receipt entries displayable at the auditor mobile device so as to increase the likelihood of expressly validating items with higher indicated importance during the in-store audit (906). For example, receipt application server 821 can send reordered receipt entries 876 to auditor mobile device 803. Prior to or after sending reordered receipt entries 876, receipt application server 821 can also send other reordered receipt entries 829 (as well as other reordered receipt entries for sales transactions conducted at location 801) to auditor mobile device 803.

Method 900 includes receiving reordered receipt entries for a digital receipt from the receipt application server, the digital receipt corresponding to a sales transaction conducted at the store location, each of the reordered receipt entries corresponding to an item purchased by a customer in the sales transaction, the reordered receipt entries reordered from a default order of the digital receipt in accordance with audit rules, the audit rules defining an audit priority for items based on characteristics of the items, an audit priority for an item indicating an importance of expressly validating the item during an in-store audit (907). For example, auditor mobile device 803 can receive reordered receipt entries 876 from receipt application server 821. Prior to or after receiving reordered receipt entries 876, receipt application server 421 can also receive other reordered receipt entries 829 (as well as other reordered receipt entries for sales transactions conducted at location 801) from receipt application server 821.

Method 900 includes caching the reordered receipt entries for the digital receipt at the auditor mobile device (908). For example, auditor mobile device 803 can cache reordered receipt entries 876 in cache 807. Prior to or after caching reordered receipt entries 876, auditor mobile device 803 can also cache other reordered receipt entries 876 (as well as other reordered receipt entries for sales transactions conducted at location 801) in cache 807.

Method 900 includes subsequent to caching the reordered receipt entries, receiving an indication that a customer is in possession of one or more items sold at the store location and is in an auditing area within the store location (909). For example, receipt locator module 804 can receive one or more of indications 871 and 872 indicating that a customer is in possession of items 834B and/or 834A. Indications 871 and 872 can be received from a peripheral device, such as, for example, a barcode scanner or keyboard, connected to auditor mobile device 803. For example, a human auditor can scan a barcode on an item in a customer's possession (e.g., in a shopping cart).

Auditor mobile device 803 can be stationed at a specified audit area within location 801 (e.g., somewhere in a path between checkout lanes and a store exit). Thus, when an item is indicated to auditor mobile device 803, auditor mobile device 803 views the customer possessing the item to be within the specified audit area.

Method 900 includes using the indication of the possessed one or more items to identify the reordered receipt entries, from among one or more reordered receipt entries cached at the auditor mobile device, for use in an in-store audit, identification of the reordered receipt entries including detecting that receipt entries for the possessed one or more items are included in the reordered receipt entries (910). For example, receipt locator module 804 can use one or more of: indications 871 and 872 to identify reordered receipt entries 876, from among reordered receipt entries cached in cache 807, for use in an in-store audit at location 801. To identify reordered receipt entries 876, receipt locator module 804 can detect that reordered receipt entries 876 includes one or more of: entry 833B for item 834B and entry 833A for item 834A.

That is, one or more items identified in a customer's possession (by indications 871 and 872) are listed in cached reordered receipt entries 876. As such, auditor mobile device 803 has some level of certainty that cached reordered receipt entries 876 correspond to the customer's sales transaction and that the cached reordered receipt entries 876 list other purchased items that are to be in the customer's possession.

Method 900 includes displaying the reordered receipt entries during the in-store audit so as to increase the likelihood of items with higher indicated importance being expressly validated during the in-store audit (911). For example, auditor mobile device 803 can display reordered entries 876 at display 806. The reordered entries can be displayed in a list format with the first ordered entry at the top and followed by other entries in descending order. For example, entry 833B can be displayed at the top of the list at display 806. Entry 833C can be displayed one or more entries below entry 833B on the list at display 806. Entry 833A can be displayed one or more entries below entry 833C. One or more other entries can be displayed below entry 833A on the list at display 806.

Reordered receipt entries 876 can be displayed at display 806 during an in-store audit of the customer in possession of one or more of items: 834A and 834B. A human auditor can refer to display 806 during the in-store audit of the customer. The human auditor can check if the customer is in possession of any items not listed in reordered receipt entries 876, and thus not listed in digital receipt 832 (e.g., the customer is attempting to steal an item). The human auditor can also check if the customer lacks possession of any items listed in reordered receipt data 876, and thus listed in digital receipt 832 (e.g., the customer left an item at a checkout lane). Since receipt entries for higher importance items are displayed nearer to the top of display 806, there is increased likelihood that the human auditor expressly validates these higher importance items.

In other embodiments, the prominence of displayed digital receipt entries can be increased or decreased by varying font size, varying font color, varying location on display 806, etc.

During an audit or when an audit is complete, the human auditor can indicate that they are satisfied with the outcome of the audit. For example, the human auditor can indicate that one or more items in a customer's possession where audited and found to be listed on the customer's receipt. When a human auditor is satisfied with the outcome of an audit, the human auditor can indicate to auditor mobile device 803 that a transaction was satisfactorily audited.

On the other hand, during an audit or when an audit is complete, the human auditor can indicate that they are not satisfied with audit. For example, the human auditor may find one or more items in a customer's possession that are not listed on the customer's receipt. When a human auditor is not satisfied with an audit, the human auditor can indicate to auditor mobile device 803 that there is a problem with the auditor. Alternately, the human auditor can call other employees to assist. For example, an unsatisfactory audit can be escalated to more senior staff for performance of other measures, such as, for example, reviewing security footage.

Figure 10:
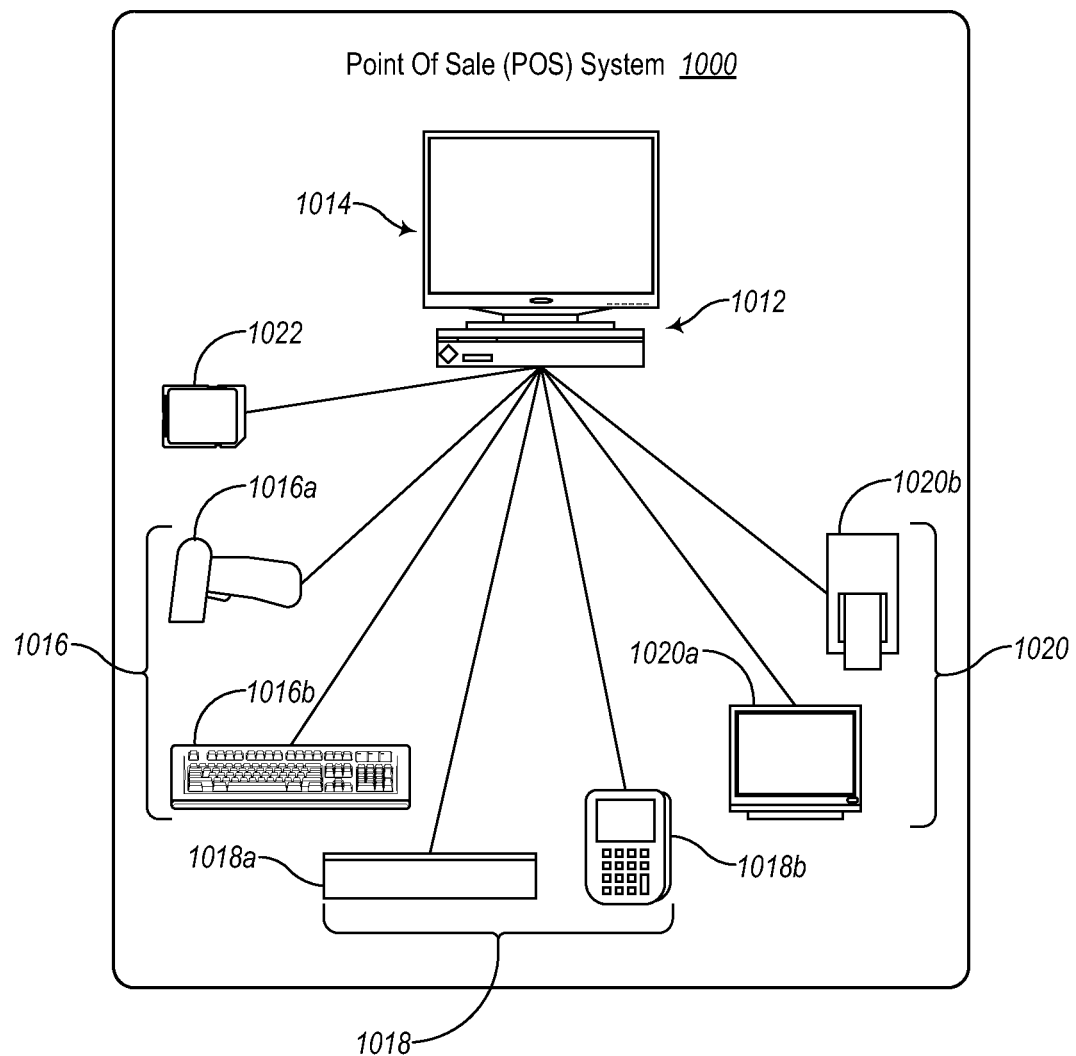
FIG. 10 illustrates an example schematic block diagram of a point-of-sale ("POS") system.

FIG. 10 illustrates an example schematic block diagram of a point-of-sale (POS) system 1000. In some embodiments, the hardware, software, or hardware and software of POS system 1000 may be configured to implement one or more methods in accordance with the present invention. For example, POS system 1000 may be manufactured, programmed, modified, or upgraded to support transferring digital receipt data to mobile devices. Any of POS systems 202A-202N, 212A-212N, 402A-402N, 602A-602C, and 802A-802J can be a POS system similar to POS system 1000.

POS system 1000 can include various components. In some embodiments, POS system 1000 includes a central or primary computer 1012, a monitor 1014 (e.g., a cashier-facing monitor 1014), one or more input devices 1016 (e.g., scanners 1016a, keyboards 1016b, scales, or the like), one or more payment devices 1018 (e.g., cash drawers 1018a, card readers 1018b) for receiving or returning payments, one or more output devices 1020 (e.g., customer-facing display 1020a or monitor 1020a, receipt printer 1020b), or the like or combinations or sub-combinations thereof, and NFC module 1022, such as, for example, an NFC dongle.

Computer 1012 may form the backbone of POS system 1010. Other components 1016, 1018, 1020, 1022 forming part of a POS system 1010 can communicate with computer 1012. Input devices 1016 and certain payment devices 1018 can feed data and commands to computer 1012 for processing or implementation. For example, scanner 1016a can pass data communicating the identity of one or more items to be purchased, returned, or the like to a computer 1012. Similarly, card reader 1018b can pass payment information to computer 1012.

On the other hand, output devices 1020 and certain payment devices 1018 can follow or implement commands issued by computer 1012. For example, cash drawer 1018a may open in accordance with the commands of computer 1012. Similarly, customer-facing display 1020a and receipt printer 820b can display or output data or information as instructed by computer 1012.

In some embodiments, in addition to handling consumer transactions (e.g., purchases, returns), POS system 1000 can provide or support certain "back office" functionality. For example, POS system 1000 can provide or support inventory control, purchasing, receiving and transferring products, or the like. POS system 1000 can also store sales and customer information for reporting purposes, marketing purposes, receivables management, trend analysis, cost analysis, price analysis, profit analysis, or the like. If desired or necessary, POS system 1000 can include an accounting interface to pass certain information to one or more in-house or independent accounting applications.

Figure 11:
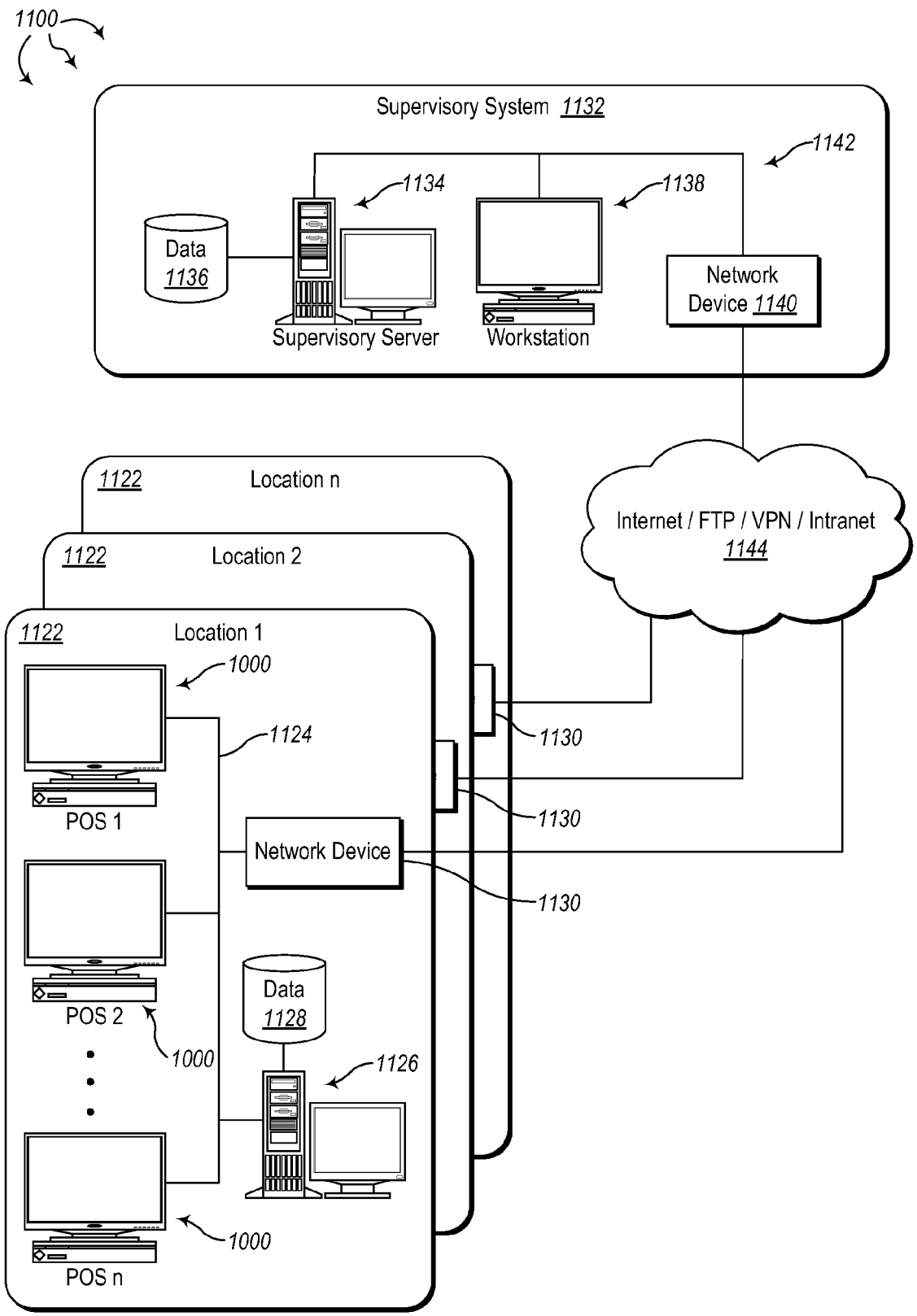
FIG. 11 illustrates an example schematic block diagram of a network of point-of-sale ("POS") systems.

In some embodiments, POS system 1000 operates substantially independently, as a stand-alone unit. Alternately, POS system 1000 may be one of several POS systems 1000 forming the front line of a larger system. FIG. 11 illustrates an example schematic block diagram of a network 1100 of point-of-sale (POS) systems 1000. For example, multiple POS systems 1000 may operate at a particular location 1122 (e.g., within a retail, brick-and-mortar store). In such embodiments, the various POS systems 1000 may be interconnected via LAN 1124. LAN 1124 may also connect the POS systems 1000 to a local server 1126.

Local server 1126 can support the operation of the associated POS systems 1000. For example, a server 1126 may provide a central repository from which certain data needed by the associated POS systems 1000 may be stored, indexed, accessed, or the like. Server 1126 can serve certain software to one or more POS systems 1000. In certain embodiments, a POS system 800 can offload certain tasks, computations, verifications, or the like to server 1126.

Alternatively, or in addition thereto, server 1126 can support certain back office functionality. For example, server 1126 can receive and compile (e.g., within an associated database 1128) data from the various associated POS systems 1000 to provide or support inventory control, purchasing, receiving and transferring products, or the like. Server 1126 can also receive and compile sales and customer information for reporting purposes, marketing purposes, receivables management, trend analysis, cost analysis, price analysis, profit analysis, or the like.

In some embodiments, one or more POS systems 1000 and/or servers 1126 corresponding to a particular location 1122 can communicate with or access one or more remote computers or resources via one or more network devices 1130. For example, a network device 1130 can enable a POS system 1000 to contact outside resources and verify the payment credentials (e.g., credit card information) provided by a customer. A network device 1130 can comprise a modem, router, or the like.

In selected embodiments, POS systems 1000 operate within an enterprise-wide system 1131 comprising multiple locations 1122 (e.g., branches 1122 or stores 1122). In such embodiments, each location 1122 may have one or more POS systems 1000, local servers 1126, local databases 1128, network devices 1130, or the like or combinations or sub-combinations thereof connected by a computer network (e.g., a LAN 1124). It may be that any of data receipt servers 221, 421, 621, and 821 are included in and/or include the functionality of a local server 1126.

Additionally, each such location 1122 may be configured to interact with one or more supervisory systems 1132. For example, multiple branch locations 1122 may report to an associated "headquarters" location or system. It may be that any of data receipt servers 221, 421, 621, and 821 are included in and/or include the functionality of a supervisory system 1132.

A supervisory system 1132 can include one or more supervisory servers 934, databases 1136, workstations 1138, network devices 1140, or the like or combinations or sub-combinations thereof. The various components of a supervisory system 1132 can be interconnected via a computer network (e.g., a LAN 1142). In selected embodiments, a supervisory system 1132 includes one or more supervisory servers 1134 providing a central repository from which certain data needed by the one or more POS systems 1100 or local servers 926 may be stored, indexed, accessed, or the like.

Alternatively, or in addition thereto, a supervisory server 934 can receive and compile (e.g., within an associated database 1136) data from the various associated POS systems 1000 or local servers 1126 to provide or support inventory control, purchasing, receiving and transferring products, or the like. A supervisory server 1134 may also receive and compile sales and customer information for reporting purposes, marketing purposes, receivables management, trend analysis, cost analysis, price analysis, profit analysis, or the like.

A supervisory system 1132 can be connected to one or more associated locations 1122 or branches 1122 in via any suitable computer network 1144 (e.g., WAN 1144). For example, in selected embodiments, one or more locations 1122 can connect to a supervisor system 1132 via the Internet. Communication over such a network 1144 can follow any suitable protocol or security scheme. For example, communication may utilize the File Transfer Protocol (FTP), a virtual private network (VPN), intranet, or the like.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:

1. At a receipt application server for a merchant, the receipt preferences database including one or more processors and system memory, the receipt application server connected to one or more Point-Of-Sale (POS) systems and one or more auditor mobile devices at each of one or more store locations for the merchant, the receipt application server configured to manage a receipt database for the merchant, a method for reordering digital receipt data for using in an in-store audit, the method comprising:

receiving digital receipt data for a sales transaction conducted at a Point-Of-Sale (POS) system, the Point-Of-Sale (POS) system in a store location selected from among the one or more store locations, the digital receipt data containing a receipt entry for each of one or more items purchased by a customer in the sales transaction;

generating a digital receipt for the sales transaction, the digital receipt generated from the digital receipt data, the digital receipt containing the receipt entry for each of the one or more purchased items, the digital receipt providing proof of the sales transaction, the digital receipt for delivery to a customer mobile device associated with the customer;

receiving an indication that the sales transaction is to be audited in the store location;

referring to audit rules, the audit rules defining an audit priority for each of the one or more purchased items based on characteristics of each of the one or more purchased items, an audit priority for an item indicating an importance of expressly validating the item during the in-store audit;

reordering the receipt entries of the digital receipt based on the defined audit priority for each of the one or more items; and sending the reordered receipt entries to an auditor mobile device at the store location, the auditor mobile device for use in auditing receipt entries contained in the digital receipt against items physically possessed by the customer upon the customer attempting to exit the store location, the reordered receipt entries displayable at the auditor mobile device so as to increase the likelihood of expressly auditing purchased items with higher indicated importance during the in-store audit.

2. The method of claim 1, wherein receiving digital receipt data for a sales transaction conducted at a Point-Of-Sale (POS) system comprises receiving an item price and item description for each of the one or more items.

3. The method of claim 1, wherein receiving an indication that the sales transaction is to be audited comprises referring to audit settings that indicate how and when deliver digital receipts to store locations for use in conducting customer audits.

4. The method of claim 1, further comprising subsequent to generating the digital receipt delivering the digital receipt to the customer mobile device associated with the customer.

5. The method of claim 1, wherein referring to audit rules comprises referring to audit rules that define an increased level of importance for expressly validating one or more of: higher profit margin items, bulkier items, and items that are more likely to be stolen, during the in-store audit.

6. The method of claim 1, wherein reordering the receipt entries of the digital receipt comprises reordering the receipt entries based on item profit margin.

7. The method of claim 1, wherein reordering the receipt entries of the digital receipt comprises reordering the receipt entries based on item bulkiness.

8. The method of claim 1, wherein reordering the receipt entries of the digital receipt comprises reordering the receipt entries based item risk of theft.

9. At an auditor mobile device for a merchant, the auditor mobile device including one or more processors and system memory, the auditor mobile device at a store location for the merchant, the auditor mobile device connected to a receipt application server, the receipt application server configured to manage a receipt database for the merchant, a method for locating digital receipt data for using in an in-store audit, the method comprising:
receiving reordered receipt entries for a digital receipt from the receipt application server, the digital receipt corresponding to a sales transaction conducted at the store location, each of the reordered receipt entries corresponding to an item purchased by a customer in the sales transaction, the reordered receipt entries reordered from a default order of the digital receipt in accordance with audit rules, the audit rules defining an audit priority for items based on characteristics of the items, an audit priority for an item indicating an importance of expressly validating the item during an in-store audit;
caching the reordered receipt entries for the digital receipt at the auditor mobile device;
subsequent to caching the reordered receipt entries, receiving an indication that a customer is in possession of one or more items sold at the store location and is in an auditing area within the store location;
using the indication of the possessed one or more items to identify the reordered receipt entries, from among one or more reordered receipt entries cached at the auditor mobile device, for use in an in-store audit, the in-store audit auditing receipt items contained in the digital receipt against items physically possessed by the customer upon the customer attempting to exit the store locations, identification of the reordered receipt entries including detecting that receipt entries for the possessed one or more items are included in the reordered receipt entries; and
displaying the reordered receipt entries during the in-store audit at the store location so as to increase the likelihood of items with higher indicated importance being expressly audited at the store location.

10. The method of claim 9, wherein each receipt entry includes an item price and an item description for an item purchased in a sales transaction.

11. The method of claim 9, wherein caching the reordered receipt entries for the digital receipt comprises caching the reordered receipt entries in accordance with a caching policy.

12. The method of claim 9, wherein receiving an indication that a customer is in possession of one or more items sold at the store location and is in an auditing area within the store location comprises receiving input from a barcode scanner in the auditing area that identifies one of the one or more items.

13. The method of claim 9, wherein displaying the reordered receipt entries during the in-store audit comprises displaying receipt entries for higher profit margin items more prominently than receipt entries for lower profit margin items.

14. The method of claim 9, wherein displaying the reordered receipt entries during the in-store audit comprises displaying receipt entries for more bulky items more prominently than receipt entries for less bulky items.

15. The method of claim 9, wherein displaying the reordered receipt entries during the in-store audit comprises displaying receipt entries for items having increased risk of being stolen more prominently than receipt entries for items having decreased risk of being stolen.

16. A system for reordering and locating digital receipt data for use in an in-store audit, the system comprising: a Point-Of-Sale (POS) computer system, a receipt application server, and an auditor mobile device, the Point-Of-Sale (POS) computer system and the auditor mobile device at a store location,
the Point-Of-Sale (POS) computer system comprising:
one or more processors;
system memory;
one or more computer storage media having stored thereon computer-executable instructions that, when executed, cause the Point-Of-Sale (POS) computer system to:
open a sales transaction;
collect digital receipt data for the sales transaction, the digital receipt data containing a receipt entry for each of one or more items purchased by a customer in the sales transaction;
close the sales transaction; and
send the digital receipt data for the sales transaction to the receipt application server;
the receipt application server comprising:
one or more processors;
system memory;
one or more computer storage media having stored thereon computer-executable instructions that, when executed, cause the receipt application server to:
receive the digital receipt data for the sales transaction from the Point-Of-Sale (POS) system;
generate a digital receipt for the sales transaction, the digital receipt generated from the digital receipt data, the digital receipt containing the receipt entry for each of the one or more purchased items, the digital receipt providing proof of the sales transaction;

receive an indication that the sales transaction is to be audited in the store location;

refer to audit rules, the audit rules defining an audit priority for each of the one or more purchased items based on characteristics of each of the one or more purchased items, an audit priority for an item indicating an importance of expressly validating the item during an in-store audit;

reorder the receipt entries of the digital receipt based on the defined audit priority for each of the one or more items; and send the reordered receipt entries to the auditor mobile device; and the auditor mobile device comprising:

one or more processors;

system memory;

one or more computer storage media having stored thereon computer-executable instructions that, when executed, cause the auditor mobile device to:

receive the reordered receipt entries from the receipt application server;

cache the reordered receipt entries for the digital receipt;

subsequent to caching the reordered receipt entries, receive an indication that the customer is in physical possession at least one of the one or more items;

using the indication of the physically possessed at least one item to identify the reordered receipt entries, from among one or more reordered receipt entries cached at the auditor mobile device, for use in an in-store audit, the in-store audit auditing receipt entries contained in the digital receipt against items physically possessed by the customer at the store location upon the customer attempting to exit the store location; and display the reordered receipt entries during the in-store audit to increase the likelihood of items with higher indicated importance being expressly audited at the store location.

17. The system of claim 16, wherein computer-executable instructions that, when executed, cause the receipt application server to refer to audit rules comprises computer-executable instructions that, when executed, cause the receipt application server to refer to audit rules that define an increased level of importance for expressly validating one or more of: higher profit margin items, bulkier items, and items that are more likely to be stolen, during the in-store audit.

18. The system of claim 16, wherein computer-executable instructions that, when executed, cause the receipt application server to reorder the receipt entries of the digital receipt comprise computer-executable instructions that, when executed, cause the receipt application server to reorder the receipt entries based on one of: item profit margin, item bulkiness, and item risk of theft.

19. The system of claim 16, wherein computer-executable instructions that, when executed, cause the auditor mobile device to receive an indication that the customer is in physical possession of at least one of the one or more items comprise computer-executable instructions that, when executed, cause the auditor mobile device to receive input from a barcode scanner, the received input identifying the at least one of the one or more items.

20. The system of claim 16, wherein computer-executable instructions that, when executed, cause the auditor mobile device to display the reordered receipt entries during the in-store audit comprise computer-executable instructions that, when executed, cause the auditor mobile device to display receipt entries for one of: higher profit margin items, more bulky items, or items having increased risk of being stolen, more prominently than receipt entries for other items.

* * * * *